US009662640B2

(12) United States Patent
Senderov et al.

(10) Patent No.: US 9,662,640 B2
(45) Date of Patent: May 30, 2017

(54) INTRODUCING MESOPOROSITY INTO ZEOLITE MATERIALS WITH A MODIFIED ACID PRE-TREATMENT STEP

(71) Applicant: Rive Technology, Inc., Boston, MA (US)

(72) Inventors: Ernest Senderov, Westampton, NJ (US); Mohammad Ibrahim Qureshi, Princeton, NJ (US)

(73) Assignee: Rive Technology, Inc., Monmouth Junction, NJ (US)

( * ) Notice: Subject to any disclaimer, the term of this patent is extended or adjusted under 35 U.S.C. 154(b) by 711 days.

(21) Appl. No.: 14/142,444

(22) Filed: Dec. 27, 2013

(65) Prior Publication Data

US 2015/0182953 A1   Jul. 2, 2015

(51) Int. Cl.
| | | |
|---|---|---|
| *B01J 29/06* | (2006.01) | |
| *C01B 39/02* | (2006.01) | |
| *B01J 29/08* | (2006.01) | |
| *B01J 29/03* | (2006.01) | |
| *B01J 29/04* | (2006.01) | |
| *B01J 29/89* | (2006.01) | |
| *B01J 29/83* | (2006.01) | |
| *B01J 29/84* | (2006.01) | |
| *B01J 29/85* | (2006.01) | |
| *B01J 29/18* | (2006.01) | |
| *B01J 29/40* | (2006.01) | |
| *B01J 29/65* | (2006.01) | |
| *B01J 29/70* | (2006.01) | |
| *C10G 29/20* | (2006.01) | |
| *C10G 45/12* | (2006.01) | |
| *C10G 47/16* | (2006.01) | |
| *C10G 50/00* | (2006.01) | |
| *C10G 11/05* | (2006.01) | |
| *B01J 35/10* | (2006.01) | |
| *B01J 29/50* | (2006.01) | |

(52) U.S. Cl.
CPC ......... *B01J 29/084* (2013.01); *B01J 29/0308* (2013.01); *B01J 29/041* (2013.01); *B01J 29/06* (2013.01); *B01J 29/08* (2013.01); *B01J 29/18* (2013.01); *B01J 29/40* (2013.01); *B01J 29/65* (2013.01); *B01J 29/7007* (2013.01); *B01J 29/7015* (2013.01); *B01J 29/7034* (2013.01); *B01J 29/83* (2013.01); *B01J 29/84* (2013.01); *B01J 29/85* (2013.01); *B01J 29/89* (2013.01); *C10G 11/05* (2013.01); *C10G 29/205* (2013.01); *C10G 45/12* (2013.01); *C10G 47/16* (2013.01); *C10G 50/00* (2013.01); *B01J 29/50* (2013.01); *B01J 35/10* (2013.01); *B01J 35/109* (2013.01); *B01J 35/1057* (2013.01); *B01J 35/1061* (2013.01); *B01J 2029/081* (2013.01); *B01J 2229/126* (2013.01); *B01J 2229/16* (2013.01); *B01J 2229/36* (2013.01); *B01J 2229/37* (2013.01); *B01J 2229/38* (2013.01)

(58) Field of Classification Search
CPC . B01J 29/06; B01J 29/084; B01J 29/18; B01J 29/40; B01J 29/65; B01J 29/7007; B01J 29/7015; B01J 29/7034; B01J 29/50; B01J 29/0308; B01J 29/041; B01J 29/89; B01J 29/183; B01J 29/84; B01J 29/85; B01J 2029/081; B01J 35/10; B01J 35/1061; B01J 35/1057; B01J 35/109; B01J 2229/16; B01J 2229/37; B01J 2229/38; B01J 2229/36; B01J 29/83; C01B 39/026
USPC ....... 502/60, 61, 79, 214; 423/700, 714, 716
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,196,182 A | 4/1980 | Willermet et al. |
| 4,205,055 A | 5/1980 | Maire et al. |
| 4,263,268 A | 4/1981 | Knox et al. |
| 4,318,824 A | 3/1982 | Turner |
| 4,439,349 A | 3/1984 | Everett et al. |
| 4,564,207 A | 1/1986 | Russ et al. |
| 4,609,972 A | 9/1986 | Edeling et al. |
| 4,637,623 A | 1/1987 | Bubik |

(Continued)

FOREIGN PATENT DOCUMENTS

| | | |
|---|---|---|
| EP | 0372938 | 6/1991 |
| JP | 2002128517 | 5/2002 |

(Continued)

OTHER PUBLICATIONS

Search Report and Written Opinion dated Apr. 20, 2015 for corresponding PCT Patent Application No. PCT/US2014/071569, 11 pages.

(Continued)

*Primary Examiner* — Elizabeth Wood
(74) *Attorney, Agent, or Firm* — Hovey Williams LLP

(57) ABSTRACT

Methods for introducing mesoporosity into zeolite materials that employ an acid pretreatment step are provided. By utilizing a non-acidic chelating agent during the acid treatment step, the zeolite material can be pretreated with a strong acid, often in higher concentrations or over shorter contact times, than had previously been contemplated. The resulting acid-treated mesoporous materials retain desirable properties, including Si/Al, UCS, and total mesopore and micropore volume. The ability to use a stronger acid without damaging the zeolite material results in a less expensive process capable of producing mesoporous zeolite materials suitable for a wide range of uses.

34 Claims, 5 Drawing Sheets

(56) References Cited

U.S. PATENT DOCUMENTS

| | | |
|---|---|---|
| 4,689,314 A | 8/1987 | Martinez et al. |
| 4,704,375 A | 11/1987 | Martinez et al. |
| 4,761,272 A | 8/1988 | Hucke |
| 4,775,655 A | 10/1988 | Edwards et al. |
| 4,806,689 A | 2/1989 | Gier et al. |
| 4,816,135 A | 3/1989 | Martinez et al. |
| 4,836,737 A | 6/1989 | Holmes et al. |
| 4,857,494 A | 8/1989 | Martinez et al. |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Duguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinnavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,440,886 B1 | 8/2002 | Gajda et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |

(56) References Cited

U.S. PATENT DOCUMENTS

| | | |
|---|---|---|
| 2005/0130827 A1 | 6/2005 | Schunk |
| 2005/0214539 A1 | 9/2005 | Ying et al. |
| 2006/0078487 A1 | 4/2006 | Endo et al. |
| 2007/0244347 A1 | 10/2007 | Ying et al. |
| 2009/0110631 A1 | 4/2009 | Garcia-Martinez |
| 2010/0190632 A1 | 7/2010 | Dight |
| 2010/0196263 A1 | 8/2010 | Garcia-Martinez |
| 2011/0118107 A1 | 5/2011 | Garcia-Martinez |
| 2011/0171121 A1 | 7/2011 | Senderov |
| 2012/0258852 A1 | 10/2012 | Martinez et al. |
| 2013/0090233 A1 | 4/2013 | Simon et al. |

FOREIGN PATENT DOCUMENTS

| | | |
|---|---|---|
| JP | 2004143026 | 5/2004 |
| WO | 0117901 | 3/2001 |
| WO | 0138223 | 5/2001 |
| WO | 2005102964 | 11/2005 |
| WO | 2006031259 | 3/2006 |
| WO | 2006/038912 | 4/2006 |

OTHER PUBLICATIONS

Al-Khattaf, S. et al., The Role of Diffusion in Alkyl-Benzenes Catalytic Cracking, Appl. Catal. A: Gen. 226; 139-153, (2002).

Bagri, R. et al.; Catalytic Pyrolysis of Polyethylene; Anal. Pyrolysis, 63:29-41 (2002).

Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.

Corma, A., From Microporous to Mesoporous Molecular Sieve Materials and Their Use in Catalysis, Chem. Rev., 97:2373-2419, (1997).

CSIC NM014-Method of Preparation of Mesoporous Alumina with High Thermal Stability, http://www.serina.es/escaparate/verproducto.cgi?idproducto=4980&refcompra=NULO, downloaded May 9, 2007, 2 pages.

Davis, M.E., Ordered Porous Materials for Emerging Applications, Nature, 417:813-821 (2002).

Davis, M.E., Zeolite and Molecular Sieve Synthesis, Chem. Mater., 4:756-768 (1992).

De Moor, P-P.E.A. et al., Imaging the Assembly Process of the Organic-Mediated Synthesis of a Zeolite, Chem. Eur. J., 5(7):2083-2088 (1999).

Degnan, T.F. et al., History of ZSM-5 Fluid Catalytic Cracking Additive Development at Mobile, Microporous Mesoporous Mater., 35-36:245-252 (2000).

De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).

Galo, J. de A. A. et al., Chemical Strategies to Design Textured Materials: from Microporous and Mesoporous Oxides to Nanonetworks and Hierarchical Structures, Chern. Rev., 2002, 102, 4093-4138.

Geidel, E. et al., Characterization of Mesoporous Materials by Vibrational Spectroscopic Techniques, Microporous and Mesoporous Mater., 65:31-42 (2003).

Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).

Goto, Y., Mesoporous Material from Zeolite, Journal of Porous Materials, 9, 2002, pp. 43-48.

Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.

Harding, R.H. et al., New Developments in FCC Catalyst Technology, Appl. Catal. A:Gen. 221:389-396 (2001).

Huang, L. et al., Investigation of Synthesizing MCM-41/ZSM Composites, J. Phys. Chem. B. 104:2817-2823 (2000).

Iijima, S., Carbon Nanotubes: Past, Present, and Future, Physica B: Condensed Matter, www.elsevier.com/locate/physb, 2002, 323, pp. 1-5.

International Search Report and Written Opinion dated Nov. 7, 2005 from International Patent Application No. PCT/US2005/05918, filed Feb. 25, 2005.

Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al.,Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

Mendes, M.F. et al., Optimization of the Process of Concentration of Vitamin E from DDSO using Supercritical CO2, Brazilian Journal of Chemical Engineering, vol. 22, No. 01, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.

(56) References Cited

OTHER PUBLICATIONS

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

Ying, J. Y. et al., Synthesis and Applications of Supramolecular-Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of The Royal Society of Chemistry, 2004, pp. 863-870.

Guo et al., Characterization of Beta/MCM-41 Composite Molecular Sieve Compared with the Mechanical Mixture Microporous and Mesoporous Materials, vols. 44-45; pp. 427-434.

Tao et al., ZSM-5 Monolith of Uniform Mesoporous Channels, Material Sciences, Chiba University, J. Am. Chem. Soc., Japan 2003, pp. 6044-6045.

INTRODUCING MESOPOROSITY INTO ZEOLITE MATERIALS WITH A MODIFIED ACID PRE-TREATMENT STEP

BACKGROUND

1. Field

One or more embodiments of the present invention relate to methods for introducing mesoporosity into a zeolite material. More particularly, one or more embodiments of the present invention relate to steps for pre-treating the zeolite material prior to introducing mesoporosity into the treated zeolite material.

2. Description of Related Art

Methods for introducing mesoporosity into zeolites and zeolite materials have been described. Several of these methods include subjecting an initial zeolite material to one or more pre-treatment steps followed by a mesopore introduction step performed on the treated material. Often, the pre-treatments steps can include modifying the framework structure of the zeolite to prepare it for subsequent introduction of mesopores, and may include, for example, contacting the initial zeolite material with a modification agent, such as an acid, often at elevated temperatures. At times, sufficiently high temperatures or very strong modification agents may actually damage the crystalline structure of the zeolite material, thereby impacting the final properties and performance of the material. Although less harsh pre-treatment methods may also be used, such milder approaches can often be more time-consuming and/or more expensive. Accordingly, although advances have been made in the art of forming mesoporous zeolite materials, improvements are still needed. In particular, a need exists for a process for pre-treating a zeolite material which does not excessively damage the material, but minimizes production time and cost.

BRIEF DESCRIPTION OF THE DRAWING FIGURES

Embodiments of the present invention are described herein with reference to the following drawing figures, wherein.

Figure 4:
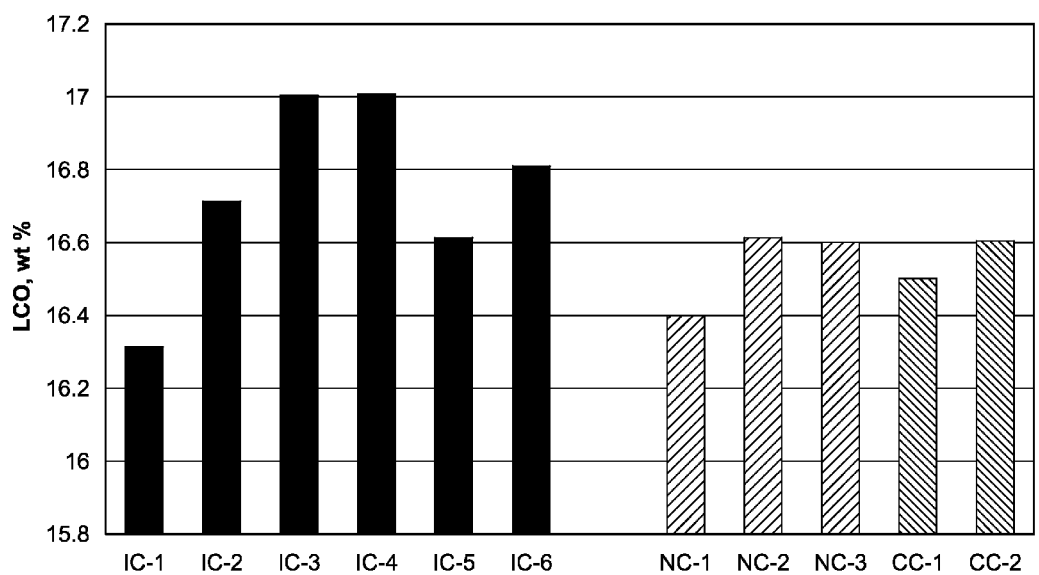
Figure 5:
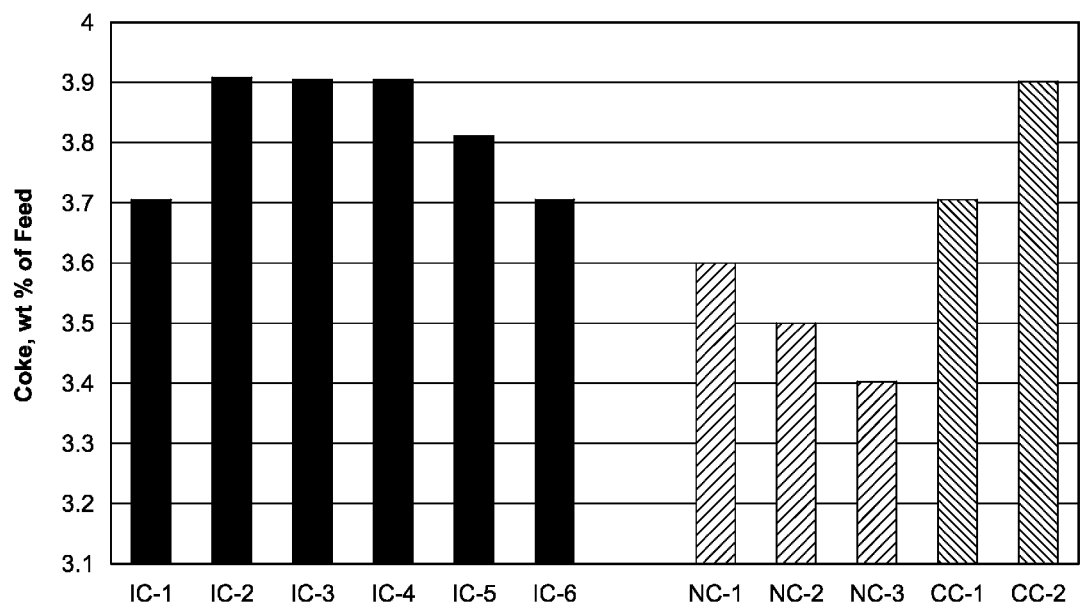

FIG. 4 is a graphical comparison of the results of the catalytic performance test conducted for each of the steam deactivated catalyst samples described in Example 8, particularly illustrating the light cycle oil (LCO) yield achieved by each catalyst during the ACE test as described in Example 8; and FIG. 5 is a graphical comparison of the results of the catalytic performance test conducted for each of the steam deactivated catalyst samples described in Example 8, particularly illustrating the coke formed during cracking with each catalyst during the ACE test as described in Example 8.

SUMMARY

Some embodiments of the present invention concerns a method of making a mesoporous zeolite material comprising the steps of (a) providing an initial zeolite material; (b) contacting the initial zeolite material with at least one acid and at least one non-acidic chelating agent in an acid-containing mixture to thereby provide an acid-treated zeolite material; and (c) contacting the acid-treated zeolite material with a basic medium under conditions sufficient to increase the mesoporosity of the acid-treated zeolite material to thereby provide a mesoporous zeolite material.

Another embodiment of the present invention concerns a method for making a mesoporous zeolite material comprising the steps of (a) contacting an initial zeolite material with at least one inorganic acid and at least one salt in an acid-containing mixture to thereby provide an acid-treated zeolite material; (b) removing at least a portion of the inorganic acid from the acid-treated zeolite material; and (c) further treating at least a portion of the acid-treated zeolite material under conditions sufficient to increase the mesoporosity of the acid-treated zeolite material to thereby provide a mesoporous zeolite material.

DETAILED DESCRIPTION

Various embodiments of the present invention concern methods for preparing a mesoporous zeolite material. In one or more embodiments, mesoporous zeolite material may be prepared by contacting an initial zeolite material with at least one acid to provide an acid-containing mixture. The acid-containing mixture may also include at least one chelating agent, such as, for example, a non-acidic chelating agent and the contacting may provide an acid-treated zeolite. The acid-treated zeolite can then be further treated with a basic medium under conditions sufficient to increase the mesoporosity of the acid-treated material. Subsequently, the resulting mesoporous zeolite material can be subjected to various post-formation treatment steps and/or be employed in any number of end use applications.

The method of making a mesoporous zeolite material according to one or more embodiments of the present invention can include the step of providing an initial zeolite material. The initial zeolite material can be any suitable material into which additional mesoporosity can be incorporated. The initial zeolite material may be a non-mesostructured or a non-mesoporous zeolite material. As used herein, the term "non-mesoporous" refers to a porous material having a total 20 to 80 Å diameter mesopore volume of less than 0.05 cubic centimeters per gram (cc/g). In some embodiments, the initial zeolite material can have a total 20 to 80 Å-diameter mesopore volume of at least about 0.001 cc/g, at least about 0.002 cc/g, at least about 0.005 cc/g and/or not more than about 0.050 cc/g, not more than about 0.025 cc/g, not more than about 0.020 cc/g, or not more than about 0.010 cc/g, measured using Argon adsorption at 87K with a Quadrasorb SI instrument and calculated according to the Density Functional Theory (DFT). In certain embodiments, the initial zeolite material can have a total 20 to 80 Å-diameter mesopore volume in the range of from about 0.001 to about 0.05 cc/g, about 0.002 to about 0.025 cc/g, or about 0.005 to about 0.020 cc/g.

Additionally, the initial zeolite material can have a total 1 to 20 Å-diameter micropore volume of at least about 0.30 cc/g. In some embodiments, the total 1 to 20 Å diameter micropore pore volume of the initial zeolite material can be at least about 0.40 cc/g, at least about 0.45 cc/g, or 0.50 cc/g, measured in a similar manner as the mesopore volume.

According to one or more embodiments wherein the initial zeolite material comprises a zeolite, the zeolite material can have a framework silicon-to-aluminum ratio (atomic Si/Al) of less than about 30, less than about 25, less than about 20, less than about 15, or less than about 10, or can have a framework Si/Al ratio in the range of from about 1 to about 30, in the range of from about 1.5 to about 25, or in the range of from 2 to 20. Note that, as used herein, the silicon-to-aluminum ratio refers to the elemental ratio (i.e., silicon atoms to aluminum atoms) of the zeolite; this is in contrast to another commonly used parameter, the silica-to-alumina ratio (i.e., $SiO_2/Al_2O_3$ or SAR) of the zeolite. Generally, the Si/Al of a zeolite can be determined via bulk chemical analysis. Instead, framework Si/Al can be determined by a combination of methods, such as, for example, bulk chemical analysis along with aluminum-27 nuclear magnetic resonance ("$^{27}$Al MAS NMR") and/or silicon-29 nuclear magnetic resonance ("$^{29}$Si MAS NMR"). Values for framework Si/Al provided herein were determined by a combination of bulk chemical analysis and $^{27}$Al MAS NMR.

Any suitable type of zeolite material can be used as the initial zeolite material. Examples of suitable zeolite materials can include, but are not limited to, alumino-silicate zeolites, zeotypes with metal substitution in framework, aluminophosphates, silico-aluminophosphates, gallophosphates, zincophosphates, and titanophosphates. Combinations of two or more of these materials may be provided as the initial zeolite material according to embodiments of the present invention. Additionally, zeolite-like materials, which represent a growing class of inorganic and organic/inorganic molecular sieves, may also be used as all or a portion of the initial zeolite material.

In one or more embodiments, the initial zeolite material can comprise a zeolite. Exemplary zeolites suitable for use as the initial zeolite material can include, but are not limited to, zeolite A, faujasites (zeolites X and Y or "FAU"), mordenite ("MOR"), CHA, ZSM-5 ("MFI"), ZSM-12, ZSM-22, beta zeolite, synthetic ferrierite (ZSM-35), synthetic mordenite, and mixtures of two or more thereof. In various embodiments, the initial zeolite material can comprise faujasite, mordenite, ZSM-5, or mixtures of two or more thereof. In other embodiments, the initial zeolite material comprises faujasite. In further embodiments, the zeolite can be a zeolite Y selected from the group consisting of USY, $NH_4Y$, NaY, a rare earth ion zeolite Y, or mixtures thereof. Specific examples of commercially-available Y zeolites suitable for use can include, but are not limited to, USY CBV500, NaY CBV 100, and $NH_4Y$ CBV 300, all available from Zeolyst International.

In one or more embodiments, when contacted with the acid during the acid treatment step, the initial zeolite material may not have been previously subjected to any form of pretreatment including, for example, steam treatment, thermal treatment, dealumination, and/or silication. Additionally, in various embodiments, the initial zeolite material can be present as a component of a composite material. Such composite materials can further include, for example, one or more binder components. In some embodiments, the composite may include at least about 0.1 weight percent, at least about 5 weight percent, at least about 15 weight percent, at least about 30 weight percent and/or not more than about 99 weight percent, not more than about 95 weight percent, not more than about 80 weight percent, not more than about 70 weight percent, not more than about 65 weight percent of the initial zeolite material, based on the total weight of the composite shaped article. In some embodiments, the composite can include initial zeolite material in an amount in the range of from about 0.1 to about 99 weight percent, about 5 to about 80 weight percent, or about 15 to about 70 weight percent, based on the total weight of the composite.

According to some embodiments of the present invention, the initial zeolite material can be contacted with at least one acid to thereby provide an acid-treated zeolite material. Although not wishing to be bound by theory, it is thought that, in some cases, contact with an acid alters the framework of the initial zeolite material, thereby making it more responsive to subsequent mesopore formation processes. In some embodiments, the acid-treated zeolite material can have a lower crystalline content than the initial zeolite material. For example, in one embodiment, the crystalline content of the initial zeolite material can be reduced by at least about 1, at least about 5, at least about 10, at least about 15, at least about 20, at least about 25, at least about 35, at least about 40, at least about 45, at least about 50, at least about 60, at least about 75, at least about 90, at least about 95, or at least about 99 percent, as measured by X-ray diffraction (XRD). In the same or another embodiment, the acid-treated zeolite material may have a crystalline content that is at least about 1, at least about 5, at least about 10, at least about 15, at least about 20, at least about 25, at least about 35, at least about 40, or at least about 45 percent less than the crystalline content of the initial zeolite material, as measured by XRD. Additionally, in certain embodiments, the acid-treated zeolite can have a crystalline content that is within about 50, within about 40, within about 30, within about 25, within about 20, within about 10, or within about 5 percent of the crystalline content of the initial zeolite. According to some embodiments, the acid-treated zeolite material can have no, or substantially no, crystalline content and may be XRD amorphous.

In various embodiments, the step of contacting the initial zeolite material with at least one acid may be sufficient to increase the Si/Al ratio of the initial zeolite material. In some embodiments, acid-treated zeolite material can have a Si/Al ratio that is at least about 1, at least about 5, at least about 10, at least about 20, at least about 30, at least about 40, at least about 50, at least about 60, at least about 70, at least about 80, at least about 90, at least about 95, at least about 100 percent greater than the Si/Al ratio of the initial zeolite material, as measured by $^{27}$Al NMR. In the same or another embodiment, the Si/Al ratio of the acid-treated zeolite can be less than about 100, less than about 90, less than about 80, less than about 75, less than about 60, less than about 50, less than about 40, less than about 30, less than about 20, or less than about 10 percent greater than the Si/Al ratio of the initial zeolite material, as measured by $^{27}$Al NMR. In certain embodiments, the Si/Al ratio of the acid-treated zeolite material can be greater than the Si/Al ratio of the initial zeolite material by an amount in the range of from about 10 to about 100 percent, about 20 to about 90 percent, or about 25 to about 80 percent. Although the increase in Si/Al ratio of the acid-treated zeolite material may be at least partially attributed to a reduced amount of aluminum, in certain embodiments, enough aluminum can be retained such that the acid-treated zeolite material has a unit cell size of at least about 24.30, at least about 24.35, at least about 24.40 Å and/or not more than about 24.60, not more than about 24.55, not more than about 24.50 Å, as measured by XRD.

During the acid treatment step, the initial zeolite material may first optionally be combined with water to form an initial slurry. The water used for the slurry may be any suitable type of water, although deionized or distilled water may be preferred. According to some embodiments, the initial zeolite material may be present in the initial slurry in an amount of at least about 1, at least about 5, at least about 10, at least about 15 weight percent and/or not more than about 60, not more than about 50, not more than about 40, not more than about 35, not more than about 30 weight percent, or in the range of from about 1 to about 60 weight percent, about 5 to about 40 weight percent, or about 10 to about 35 weight percent, based on the total weight of the initial slurry.

The initial zeolite material, optionally present as part of the initial slurry, may then be contacted with at least one acid to form an acid-containing mixture. In some embodiments, the initial zeolite material may be contacted with only one acid, while, in other embodiments, combinations of two or more acids may be used. The acid or acids used to contact the initial zeolite material may comprise weak acids or strong acids and, when two or more acids are present, at least one may be a strong acid. In some embodiments, a strong acid may have a pKa of less than about 10, a pKa of less than about 8, less than about 6, less than about 4, or less than about 3. Additionally, the acids used during the contacting step may comprise organic acids or inorganic acids and, in some embodiments, at least one inorganic or mineral acid may be used. Examples of suitable acids can include, but are not limited to, hydrochloric acid, nitric acid, sulfuric acid, phosphoric acid, boric acid, perchloric acid, hydrofluoric acid, and combinations thereof. Further, in the same or another embodiment, at least one of the acids can comprise an organic acid. Exemplary organic acids include, but are not limited to, acetic acid, citric acid, sulfonic acid, oxalic acid, succinic acid, ethylenediaminetetraacetic acid (EDTA), tartaric acid, malic acid, glutaric acid, and combinations thereof.

In various embodiments, one or more acids used during the acid treatment step can comprise an aqueous acid solution that includes one or more acids in combination with water. In some embodiments, the aqueous acid solution can be a concentrated acid solution, which comprises at least about 15 percent acid, based on the total weight of the solution. In other embodiments, the aqueous acid solution may be a dilute acid solution that comprises less than 15 percent acid, based on the total weight of the solution. The acid or acids used to contact the initial zeolite material can be present in the acid-containing mixture an amount of at least about 1, at least about 1.5, at least about 2, at least about 2.5, at least about 3, at least about 3.5, at least about 4, at least about 4.5 and/or not more than about 10, not more than about 9, not more than about 8, not more than about 7, not more than about 6, not more than about 5, not more than about 4 milliequivalents per gram of initial zeolite (meq/g), or in the range of from about 1 to about 10 meq/g, about 2 to about 9 meq/g, about 3 to about 7 meq/g.

In addition to the acid, at least one dealumination agent may also be present in the acid-containing mixture during the contacting of the initial zeolite material. In various embodiments, the dealumination agent can comprise a chelating agent, a complexing agent, or combinations thereof. As used herein, the term "chelating agent" refers to a multi-ligand agent capable of coordinating with one or more dissolved ions, while the term "complexing agent" refers to a single-ligand coordinating agent. In some embodiments, the dealumination agent can comprise a chelating agent, which can be present in the acid-containing mixture in an amount of at least about 1, at least about 1.5, at least about 2, at least about 2.5, at least about 3 and/or not more than about 10, not more than about 9.5, not more than about 9, not more than about 8.5 millimoles of chelating agent per gram of initial zeolite material (mmol/g), or in the range of from about 1 to about 10 mmol/g, about 2 to about 9 mmol/g, or about 3 to about 8.5 mmol/g. In some embodiments, the ratio of chelating agent to acid in the acid-containing mixture, expressed in millimoles of chelating agent to milliequivalents of acid (mmol/meq) may be at least about 0.10:1, at least about 0.20:1, at least about 0.25:1, at least about 0.30:1, at least about 0.35:1, at least about 0.40:1, at least about 0.50:1 and/or not more than about 1.25:1, not more than about 1.2:1, not more than about 1.15:1, not more than about 1.10:1, not more than about 1.05:1, not more than about 1:1, not more than about 0.95:1, not more than about 0.90:1, or in the range of from about 0.10:1 to about 1.25:1, about 0.20:1 to about 1.15:1, about 0.30:1 to about 1.05:1.

The chelating agent can be any suitable type of chelating agent, and, in some embodiments, can comprise a non-acidic chelating agent. In certain embodiments, the non-acidic chelating agent can comprise a salt. The salt may be an organic salt or inorganic salt and may, in some embodiments, comprise the salt of an acid (i.e., an acid salt). Suitable salts can include, for example, sulfates, citrates, oxalates, tartrates, gluconates, fluorides, acetates, phosphates, nitrates, and combinations thereof. The cationic components of the chelating salt are not particularly limited, but may be chosen such that the resulting salt is water soluble. Accordingly, in some embodiments, the cationic component of the chelating salt does not comprise calcium, barium, or lead (II). Suitable cationic components can include, but are not limited to, the alkali metals, water-soluble alkaline earth metals, ammonium, and combinations thereof.

When the chelating salt comprises an acid salt, the anionic component of the salt may or may not correspond to the anionic component of at least one of the acids used to contact the initial zeolite material during the acid pretreatment step. For example, in some embodiments, the acid used to contact the initial zeolite material may comprise at least one strong acid, and the chelating salt can be the salt of the same strong acid, a different strong acid, or a weak acid. Similarly, in the same or another embodiment, the acid used to contact the initial zeolite material may comprise at least one inorganic acid, and the chelating salt may be the salt of the same inorganic acid, a different inorganic acid, or an organic acid. When two or more acids are used to contact the initial zeolite material, the acid-containing mixture can include at least one salt of an acid used during contacting and/or at least one salt of an acid not used during contacting. Exemplary combinations of acids and salts particularly suitable for use in various embodiment of the present invention include, but are not limited to, sulfuric acid/sulfate salt, sulfuric acid/citrate salt, sulfuric acid/phosphate salt, phosphoric acid/sulfate salt, phosphoric acid/citrate salt, phosphoric acid/phosphate salt, and combinations thereof.

In addition to the acid and chelating agent, the acid-containing mixture may include one or more additional components. Such components can include, but are not limited to, one or more acidic chelating agents, one or more complexing agents, one or more surfactants, one or more filtering aides, one or more defoaming or anti-foaming agents, and combinations thereof. These additional components can be added prior to, along with, or subsequent to the acid and/or chelating agent in the acid-containing mixture.

When utilized, these components may be present in the acid-containing mixture in an amount of not more than about 8, not more than about 7.5, not more than about 6, not more than about 5 millimoles per gram of initial zeolite material (mmol/g).

When performing the acid treatment step, the acid, dealumination agent, and any additional components, if present, can be combined according to any suitable method. In some embodiments, the acid and/or dealumination agent can be combined to form a mixture and the resulting mixture can be contacted with the initial zeolite material, optionally present in an initial slurry. In another embodiment, one of the acid and dealumination agent may first be combined with the initial zeolite material (or initial slurry) to form an intermediate slurry and the other of the components may be added, with or without agitation, to the intermediate slurry.

In some embodiments, the acid may be added to the initial or intermediate slurry over a period of at least about 2, at least about 5, at least about 10, at least about 15 minutes, measured between the addition of the initial and final drops of acid into the slurry. In other embodiments, all or substantially all of the acid may be added at once (or nearly at once) so that at least about 75 percent, at least about 85 percent, at least about 90 percent, at least about 95 percent of the total amount of acid is added to the slurry over a period of less than about 5 minutes, less than about 3 minutes, less than about 2 minutes, or less than 1 minute. In some embodiments, the rate of acid addition into the initial or intermediate slurry can be at least about 0.1, at least about 0.5, at least about 1, at least about 2 mL/min and/or not more than about 20, not more than about 15, not more than about 12 mL/min, or in the range of from about 0.1 to about 20 mL/min, about 0.5 to about 15 mL/min or about 2 to about 12 mL/min. In other embodiments, the rate of acid addition can be at least about 1, at least about 2, at least about 5, at least about 10 mL/second and/or not more than about 20, not more than about 15, not more than about 12 mL/s, or in the range of from about 1 to about 20 mL/s, about 2 to about 15 mL/s, or about 5 to about 10 mL/s.

According to some embodiments, at least a portion of the acid treatment step can be carried out at a temperature of at least about 20° C., at least about 25° C., at least about 30° C. and/or not more than about 50° C., not more than about 45° C., not more than about 40° C., or a temperature in the range of from about 20 to about 50° C., about 25 to about 45° C., or about 30 to about 40° C. The acid-containing mixture may then be held, optionally under agitation, for a period of time of at least about 10 minutes, at least about 30 minutes, at least about 1 hour and/or not more than about 8, not more than about 6, not more than about 4 hours. The pH of the acid-containing mixture during this stage is at least about 1, at least about 1.5, at least about 2, at least about 2.5 and/or not more than about 6, not more than about 5, not more than about 4, or can be in the range of from about 1 to about 6, about 2 to about 5, about 2.5 to about 4.

Upon completion of the acid treatment step, at least a portion of the acid-containing mixture can be removed from the acid-treated zeolite material by, for example, separating at least a portion of the liquid component from the acid-treated zeolite material. According to some embodiments, at least about 75, at least about 85, at least about 90 percent of the total amount of liquid can be separated from the acid-containing mixture, while retaining at least about 75, at least about 85, at least about 95 percent of the total amount of acid-treated zeolite material. In various embodiments, after separation, less than about 20, less than about 10, less than about 5, less than about 2, or less than about 1 percent of the acid and/or chelating agent present during the acid treatment step may remain on, in, or with the filtered zeolite material.

In some embodiments, the step of removing the acid-containing mixture may comprise filtering the acid-treated zeolite material from the liquid portion of the acid-containing mixture. Any suitable type of filtration may be used, including, for example, vacuum filtration. During filtration, the acid-treated and/or filtered zeolite material may also be contacted with at least one wash liquid to facilitate further separation of the acid-containing mixture. In some embodiments, the wash liquid can be an aqueous wash liquid, optionally including one or more components other than water. For example, in some embodiments, the wash liquid can include at least one acid such that the pH of the wash liquid is at least about 1, at least about 2, at least about 3 and/or not more than about 6, not more than about 5.5, not more than about 5, or about 1 to about 6, about 2 to about 5.5, about 3 to about 5. According to this embodiment, the acid used may be the same as or different than the acid used in the acid treatment step and, in some embodiments, two or more acids may be used in sufficient quantities to provide a pH for the wash liquid in the ranges provided.

In the same or another embodiment, the wash liquid may comprise one or more chelating agents, including, for example, one or more non-acidic chelating agents as described previously. When present, the chelating agent may be the same as or different than the chelating agent used during the acid treatment step. The chelating agent may be a non-acidic chelating agent and the wash liquid may or may not further comprise an acid. In certain embodiments, the chelating agent may be present in the wash liquid in an amount of at least about 0.25, at least about 0.50, at least about 0.75 weight percent and/or not more than about 5, not more than about 3, not more than about 2 weight percent, based on the total weight of wash liquid. In certain embodiments, the chelating agent can be present in the wash liquid in an amount in the range of from about 0.25 to about 5 weight percent, about 0.50 to about 3 weight percent, about 0.75 to about 2 weight percent, based on the total weight of the wash liquid.

During filtration, the acid-treated and/or filtered zeolite may be washed multiple times during filtration, such that the zeolite material can be contacted with two or more wash liquids in sequence. When multiple washes are employed during filtration, at least one of the wash liquids may be different from one or more of the other wash liquids. In other embodiments, each of the washing steps used in a sequential, multiple wash filtration may be the same. For example, according to some embodiments, the filtered zeolite material contacted with a wash liquid at least about two, at least about 3, or at least about 4 times, using at least two, at least three, or at least four wash liquids. In another embodiment, the filtered zeolite material may be washed at least two, at least three, or at least 4 times, using the same type of wash liquid each time.

In certain embodiments, the zeolite material may be first contacted with at least one acidic wash liquid having a pH as described above in at least one of the ranges provided above, and may then be contacted with at least one wash liquid comprising at least one non-acidic chelating agent. Thereafter, the filtered zeolite material may be finally contacted with a deionized water wash. In other embodiments, an interim deionized water wash may be performed between the washes using the acidic wash liquid and the wash liquid including at least one chelating agent. In certain embodiments, the weight ratio of wash liquid used during a single wash step to the liquid removed from the filtered material during that wash step can be at least about 0.5:1, at least about 0.75:1, at least about 0.90:1 and/or not more than about 1.5:1, not more than about 1.25:1, not more than about 1.05:1, or in the range of from about 0.5:1 to 1.5:1, about 0.75:1 to about 1.25:1, or about 0.90:1 to about 1.05:1.

In various embodiments, the step of removing at least a portion of the acid-containing mixture from the zeolite material can include contacting the acid-treated zeolite with at least one base to neutralized at least a portion of the residual acid. This step, when utilized, can be carried out before, during, or subsequent to the above-described filtration step. In some embodiments, the base can be added to the wet filter cake resulting from the above-described wash step, which may be admixed with deionized water to form a slurry. According to this embodiment, the base may be added to the slurry and the pH of the resulting mixture can be at least about 6, at least about 6.5, at least about 7 and/or not more than about 9, not more than about 8.5, not more than about 8, or in the range of from about 6 to about 9, about 6.5 to about 8.5, about 7 to about 8. In some embodiments, the base utilized during this step may be selected from the group consisting of sodium hydroxide, potassium hydroxide, ammonium hydroxide, sodium carbonate, potassium carbonate, and combinations thereof.

After the acid-treated zeolite material has been separated from the acid-containing mixture, and optionally washed and/or neutralized, it may then be optionally dried according to any suitable method. In various embodiments, the acid-treated zeolite may be exposed to a temperature of at least about 25° C., at least about 30° C., at least about 50° C., at least about 65° C., at least about 75° C. and/or not more than about 150° C., not more than about 135° C., not more than about 125° C., not more than about 110° C., not more than about 100° C., not more than about 90° C. for a period of at least about 5, at least about 10, at least about 30 minutes or at least about 1 hour. In certain embodiments, the drying temperature can be in the range of from about 25 to about 150° C., about 50 to about 125° C., about 75 to about 100° C. for the time period falling within one or more of the ranges provided above. In some embodiments, the treated zeolite material can be dried for a period of not more than about 24, not more than about 12, not more than about 4, not more than about 2 hours. In other embodiments, the drying step may be omitted entirely and the wet cake resulting from the separation step may be directly subjected to the below-described mesopore formation process.

According to some embodiments, prior to introduction of mesoporosity, the initial or acid-treated zeolite material may optionally be subjected to one or more additional framework modification steps including, for example, calcination and/or steam treatment. When utilized, one or more of the additional framework modification steps may be carried out before or after the acid treatment step described previously. When the initial or acid-treated zeolite material is further framework modified using calcination, the zeolite material may be calcined in the presence of air or other inert gas to a temperature of at least about 300° C., at least about 400° C., at least about 500° C., at least about 600° C., at least about 700° C. and/or not more than about 1200° C., not more than about 1100° C., not more than about 1000° C., or a temperature in the range of from about 300 to about 1200° C., about 500 to about 1100° C., or about 700 to about 1000° C. The calcination step, when employed, can be carried out for at least about 15, at least about 30, at least about 45 minutes, at least about 1 hour and/or not more than about 8, not more than about 6, not more than about 3, not more than about 2 hours, or for a time period in the range of from about 15 minutes to about 8 hours, about 30 minutes to about 6 hours, or about 45 minutes to about 2 hours.

In addition or in the alternative, the initial zeolite material or the acid-treated zeolite material may be exposed to a steam treatment for further framework modification. In some embodiments, the initial or acid-treated zeolite can be contacted with steam at a temperature of at least about 450° C., at least about 500° C., at least about 550° C. and/or not more than about 1000° C., not more than about 800° C., not more than about 650° C., or a temperature in the range of from about 450 to about 1000° C., about 500 to about 800° C., about 550 to about 650° C. The steam treatment can be performed for a time period of at least about 1, at least about 5, at least about 10 minutes and/or not more than about 24, not more than about 12, not more than about 8, not more than about 2 hours, or a time period in the range of from about 1 minute to about 24 hours, about 5 minutes to about 8 hours, about 10 minutes to about 2 hours.

After the framework modification process has been completed, the modified zeolite material (e.g., the acid-treated, calcined, and/or steam-treated zeolite material) can be further treated under conditions sufficient to increase the mesoporosity of the zeolite material. In some embodiments, this can include contacting at least a portion of the modified zeolite material with at least one mesopore forming agent under conditions sufficient to increase the mesoporosity of the modified zeolite material. Specific details regarding specific mesopore forming agents and processes for increasing the mesoporosity of a zeolite material are further described in U.S. Patent Application Publication Nos. 2007/0244347 and 2012/0258852, the entire disclosures of which are incorporated by reference herein to the extent not inconsistent with the present description. Various aspects of such processes are also described below.

According to some embodiments, the mesopore forming agent can include a pH controlled medium such as, for example, an acid or a base. In some embodiments, the pH controlled medium can be a basic medium and can have a pH of at least about 8. The pH of the basic medium can be at least about 8.5, at least about 9, at least about 9.5 and/or not more than about 14, not more than about 13, not more than about 12 or it can have a pH in the range of from about 8.5 to about 14, about 9 to about 13, or about 9.5 to about 12. Any suitable basic medium can be used and may be selected from the group consisting of ammonium hydroxide, tetraalkyl ammonium hydroxides, sodium hydroxide, potassium hydroxide, sodium carbonate, potassium carbonate, amines, and mixtures thereof. In some embodiments, the basic medium may comprise ammonium hydroxide, sodium hydroxide, and combinations thereof.

Optionally, in some embodiments, the mesopore forming agent may also include at least one surfactant. When a surfactant is used, the acid-treated zeolite material may be contacted with the surfactant before, during, or after it has been contacted with the pH controlled medium. In some embodiments, the modified zeolite material can be simultaneously contacted with a basic medium and surfactant under conditions sufficient to increase the mesoporosity of the modified zeolite material. Any now known or hereafter discovered surfactants may be used and, in certain embodiments, a cationic surfactant can be employed. In certain embodiments, the surfactant employed can comprise one or more alkyltrimethyl ammonium salts and/or one or more dialkyldimethyl ammonium salts. In various embodiments, the surfactant can be selected from the group consisting of cetyltrimethyl ammonium bromide ("CTAB"), cetyltrimethyl ammonium chloride ("CTAC"), and mixtures thereof.

In other embodiments, the surfactant can comprise a nonionic surfactant. Examples of suitable commercially available non-ionic surfactants include, but are not limited to, PLURONIC™ surfactants (e.g., PLURONIC P123™), available from BASF. Alternatively, in some embodiments, the mesopore introduction process can be performed in the absence or substantial absence of a mesopore forming agent and may not include the use of cationic surfactants, non-ionic surfactants, polymers, and/or soft templates.

In some embodiments, the resulting slurry, which can include the acid-treated zeolite combined with a base and an optional surfactant, can have a pH of at least about 7, at least about 8, at least about 9 and/or not more than about 13, not more than about 12, not more than about 11, or in the range of from about 7 to about 13, about 8 to about 12, or about 9 to about 11. In another embodiment, when the pH controlled agent comprises an acid, the pH of the resulting slurry can be at least about 3, at least about 4, at least about 5 and/or not more than about 7, not more than about 6, not more than about 5, or in the range of from about 3 to about 7 or about 4 to about 6. If needed, additional acids and/or bases can be added, as needed, to adjust the pH of the slurry to a value within the desired range. In some embodiments, the amount of pH controlled agent employed can be at least about 0.1, at least about 0.5, at least about 0.9 mmol per gram of initial zeolite material (mmol/g) and/or not more than about 20, not more than about 10, not more than about 5, not more than about 4 mmol/g, or the pH controlled agent can be present in an amount in the range of from about 0.1 to about 20 mmol/g, about 0.5 to about 10 mmol/g, about 0.9 to about 4 mmol/g.

In various embodiments, the contacting of the acid-treated zeolite material with the pH controlled agent and optional surfactant may be carried out under conditions sufficient to increase the mesoporosity of the acid-treated zeolite material. In some embodiments, at least a portion of the contacting can be carried out at a temperature of at least about 20° C., at least about 30° C., at least about 40° C., at least about 50° C. and/or not more than about 200° C., not more than about 150° C., not more than about 100° C., not more than about 90° C., or at a temperature in the range of from about 20 to about 200° C., about 30 to about 150° C., about 40 to about 100° C., about 50 to about 90° C. In the same or other embodiments, the acid-treated zeolite material can be contacted with the pH controlled medium and, optionally, surfactant for a time period of at least about 10, at least about 30 minutes, at least about 1 hour, at least about 2 hours and/or not more than about 2 weeks, not more than about 1 week, not more than about 4 days, not more than about 2 days, not more than about 1 day, or not more than about 12 hours. The time period for contacting the acid-treated zeolite material with a pH controlled agent and surfactant, if present, can be in the range of from about 10 minutes to about 2 weeks, about 30 minutes to about 1 day, or about 2 hours to about 12 hours.

After contact with the pH controlled medium (and surfactant, if present), the resulting mesoporous zeolite material can be filtered, optionally washed with one or more wash liquids, and dried, according to one or more embodiments described above. If a surfactant was used during the mesoporosity introduction step, the resulting mesoporous zeolite material may be subjected to one or more additional heat treatment or chemical extraction steps in order to remove and/or recover at least a portion of the pore forming agent. Suitable examples of pore forming agent removal processes, including, for example calcination, are described in detail in U.S. Patent Application Publication No. 2012/0258852.

Thereafter, the mesoporous zeolite material may be subjected to a thermal treatment step that can include, for example, contacting at least a portion of the zeolite material with steam to form a thermally-treated mesoporous zeolite material. In some embodiments, the zeolite material can be contacted with steam, optionally combined with ammonia, at a temperature of at least about 450° C., at least about 500° C., at least about 550° C. and/or not more than about 750° C., not more than about 700° C., not more than about 650° C., or a temperature in the range of from about 450 to about 750° C., about 500 to about 700° C., about 550 to about 650° C. When ammonia is used during the thermal treatment step, it may be present in an amount of at least about 1, at least about 5, at least about 10 weight percent and/or not more than about 50, not more than about 25, not more than about 15 weight percent, based on the total weight of vapor, or the ammonia may be present in an amount in the range of from about 1 to about 50 weight percent, about 5 to about 25 weight percent, about 10 to about 15 weight percent, based on the total weight of vapor introduced into the thermal treatment zone. During thermal treatment, the zeolite material may be contacted with steam (or the steam/ammonia mixture) for at least about 1, at least about 5, at least about 10, at least about 20 minutes and/or not more than about 12, not more than about 10, not more than about 8, not more than about 6 hours, or a period of time in the range of from about 1 minute to about 12 hours, about 5 minutes to about 10 hours, about 10 minutes to about 8 hours, or about 10 minutes to about 6 hours.

The thermally-treated zeolite material then can optionally be subjected to one or more post-formation treatments. Suitable post-formation treatments are described, for example, in U.S. Patent Application Publication No. 2007/0244347. In various embodiments, the mesoporous zeolite material can be subjected to one or more post-formation treatments selected from the group consisting of calcination, ion exchange, steaming, incorporation into an adsorbent, incorporation into a catalyst, re-alumination, silicon incorporation, incorporation into a membrane, and combinations of two or more thereof. Suitable ion exchange procedures can include, but are not limited to, ammonium ion exchange, rare earth ion exchange, lithium ion exchange, potassium ion exchange, calcium ion exchange, and combinations of two or more thereof.

According to some embodiments, the thermally-treated zeolite material can optionally be subjected to an ammonium exchange step to thereby provide an ammonium-exchanged, thermally-treated zeolite material. During the ammonium exchange step, the thermally-treated zeolite material may be dispersed in water to form a slurry. An ammonium salt, such as, for example, ammonium nitrate, ammonium phosphate, ammonium citrate, or combinations thereof, can then be added to the slurry. The resulting mixture can be heated to a temperature of at least about 30° C., at least about 40° C., at least about 50° C. and/or not more than about 120° C., not more than about 110° C., not more than about 100° C., not more than about 90° C., or a temperature in the range of from about 30 to about 120° C., about 40 to about 110° C., about 50 to about 100° C. The elevated temperature can be held, optionally under agitation, for at least about 10, at least about 20, at least about 30 minutes and/or not more than about 2 hours, not more than about 1 hour, not more than about 45 min, not more than about 35 minutes, or for a time period in the range of from about 10 minutes to about 2 hours, about 20 minutes to about 1 hour, about 30 minutes to about 45 minutes. A small amount of acid may be added to the slurry, drop-wise, to provide a final slurry having a pH of at least about 1, at least about 2, at least about 3 and/or not more than about 7, not more than about 6, not more than about 5, or in the range of from about 1 to about 7, about 2 to about 6, about 3 to about 5.

Following the ammonium exchange step, the mixture can be filtered, optionally washed with at least one wash liquid, and dried. In some embodiments, the solids can be washed with one or more wash liquids as described in detail previously. Optionally, the procedure may be repeated at least one, at least two, or at least three additional times.

In various embodiments of the present invention, the ammonium-exchanged mesoporous zeolite material can then be subjected to a steam stabilization step wherein the mesoporous zeolite material is contacted with steam at an elevated temperature of a period of time. The steam used during this step may be 100 percent pure steam with no additional components. In some embodiments, the steam stabilization can be carried out at a temperature of at least about 1200° F., at least about 1250° F., at least about 1300° F. and/or not more than about 1600° F., 1500° F., or 1450° F., and, in certain embodiments, it can be carried out at about 1400° F. In the same or other embodiments, the mesoporous zeolite material can be conducted with steam for a period of time of at least about 10 minutes, at least about 1 hour, at least about 2 hours and/or not more than about 12, not more than about 10 hours, or not more than about 8 hours, or for a time period in the range of from about 10 minutes to about 12 hours, about 1 hour to about 10 hours, or for about 2 hours to about 8 hours. In certain embodiments, the steam stabilization step may be carried out for 8 hours. In some embodiments, the steam stabilization stage may not be performed on the total amount of mesoporous zeolite produced as described above, but instead, may only be performed on a small fraction or sample of the mesoporous zeolite. Thus, according to these embodiments, the steam stabilization step may be used to test one or more properties of the mesoporous zeolite material, but may not necessarily be required to form a mesoporous zeolite for one or more specific end uses.

In various embodiments, the mesoporous zeolite produced as described herein may be a one-phase hybrid single crystal hybrid material having long-range crystallinity or may be fully crystalline. As used herein, the terms "long-range crystallinity" and "fully crystalline" are substantially synonymous, and are intended to denote solids with one or more phases having repeating structures, referred to as unit cells, that repeat in a space for at least 10 nm. The mesoporous zeolite may also include a plurality of mesopore surfaces that define a plurality of mesopores therein. In contrast to many conventional modified zeolites, the mesopores of the materials described herein may be defined within and may penetrate through at least a portion of the crystalline structure of the mesoporous zeolite material. Thus, rather than include separate regions of crystalline structures, the mesoporous zeolite material described herein may include a single phase of intra-crystalline, not intercrystalline, mesopores. Furthermore, a cross-sectional area of each of the plurality of mesopores can be substantially the same. Additionally, in one or more embodiments, the mesoporous zeolite material can be a mesostructured zeolite material.

In various embodiments, the mesoporous zeolite material can have a total 20 to 80 Å diameter mesopore volume of at least about 0.05, at least about 0.06, at least about 0.07, at least about 0.08, at least about 0.09, at least about 0.10, at least about 0.11, at least about 0.12, at least about 0.13, at least about 0.14, at least about 0.15 cc/g and/or not more than about 0.35, not more than about 0.30, not more than about 0.25, not more than about 0.20, not more than about 0.19, not more than about 0.18 cc/g, or in the range of from about 0.05 to about 0.35 cc/g, about 0.08 to about 0.25 cc/g, about 0.10 to about 0.19 cc/g, about 0.11 to about 0.18 cc/g. In the same or other embodiments, the mesoporous zeolite material can have a total 20 to 80 Å diameter mesopore volume that is at least about 5, at least about 10, at least about 20, at least about 30, at least about 40, at least about 50, at least about 60, at least about 70, at least about 80, at least about 90, at least about 100, at least about 200, at least about 300, at least about 400, or at least about 500 percent greater than the 20 to 80 Å diameter mesopore volume of the initial zeolite material. Additionally, the mesoporous zeolite material can retain at least a portion of the micropore volume of the initial zeolite. In various embodiments, the mesoporous zeolite material can have a 0 to 20 Å micropore volume of at least about 0.10, at least about 0.11, at least about 0.12, at least about 0.13, at least about 0.14, or at least about 0.15 cc/g.

In one or more embodiments, the mesoporous zeolite material can exhibit the above-described mesopore and micropore volumes after being subjected to the above-described steam treatment. For example, in various embodiments, the mesoporous zeolite material can exhibit the above-described mesopore and micropore volumes after steaming at 1,400° F. for 8 hours with 100 percent steam.

In various embodiments, when the initial zeolite material is a zeolite, the resulting mesoporous zeolite can have a framework Si/Al of less than less than about 30, less than about 25, less than about 20, less than about 15, or less than about 10. Additionally, in one or more embodiments, the mesoporous zeolite material can have a crystalline content of at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95 weight percent, as measured by XRD.

Applications

The unique structure of mesoporous zeolite materials as described herein can be useful to a variety of fields, and should address certain limitations associated with conventional zeolites. As catalysis is an important field of application for zeolites, special emphasis is placed on the catalytic applications of mesoporous zeolite materials as described herein.

The combination of a mesostructure, a high surface-area, and controlled pore or interior thickness as measured between adjacent mesopores should provide for access to bulky molecules and reduce the intracrystalline diffusion barriers. Thus, enhanced catalytic activity for bulky molecules should be observed using mesoporous zeolite materials as described herein, as compared to conventional zeolites. Catalytic cracking is selectivity and/or efficiency limited, because diffusion is limited by the small pore size of the zeolite H—Y. Because the conventional unconverted zeolite crystal has limited diffusion, it is difficult for an initial reaction product (e.g., 1,3-diisopropyl benzene) to exit the zeolite. As a result, over cracking occurs and light compounds are formed resulting in excess formation of undesirable products, such as cumene, benzene, and coke. In contrast to catalytic cracking with the unmodified conventional zeolite H—Y, the larger pore size, the controlled mesopore volume, and the controlled interior or pore wall thickness present in the mesoporous zeolite material having long-range crystallinity facilitates the exit of desired products (i.e., 1,3-diisopropyl benzene) from the mesostructure, and over cracking that produces cumene, benzene, and coke is avoided. As a result, there is a higher conversion of the desired product, 1,3-diisopropyl benzene.

Acid catalysts with well-defined ultra-large pores are highly desirable for many applications, especially for catalytic cracking of the gas oil fraction of petroleum, whereby slight improvements in catalytic activity or selectivity would translate to significant economic benefits. More than 135 different zeolite structures have been reported to date, but only about a dozen of them have commercial applications, mostly zeolites with 3-D (3-dimensional) pore structures. The incorporation of 3-D mesopores may be beneficial for zeolites with 1-D and 2-D pore structures as it would greatly facilitate intracrystalline diffusion. Zeolites with 1-D and 2-D pore structures are not widely used, because the pore structure is less then optimal.

Pyrolysis of plastics has gained renewed attention due to the possibility of converting these abundant waste products into valuable chemicals while also producing energy. Acidic catalysts, such as zeolites, have been shown to be able to reduce significantly the decomposition temperature of plastics and to control the range of products generated. However, the accessibility of the bulky molecules produced during plastic degradation has been severely limited by the micropores of zeolites. The use of mesoporous zeolite materials as described herein can allow for reduced decomposition temperatures compared to unmodified commercial zeolites.

With their improved accessibility and diffusivity compared to conventional zeolites, mesoporous zeolite materials as described herein may also be employed in place of unmodified conventional zeolites in other applications, such as gas and liquid-phase adsorption, separation, catalysis, catalytic cracking, catalytic hydrocracking, catalytic isomerization, catalytic hydrogenation, catalytic hydroformylation, catalytic alkylation, catalytic acylation, ion-exchange, water treatment, pollution remediation, etc. Many of these applications suffer currently from limitations associated with the small pores of zeolites, especially when bulky molecules are involved. Mesoporous zeolite materials as described herein present attractive benefits over zeolites in such applications.

Organic dye and pollutant removal from water is of major environmental importance, and represents the third major use of zeolites (accounting for 80 tons of zeolites per year). However, most of the organic dyes are bulky, which make removal of these materials slow or incomplete, requiring a huge excess of zeolites in the process. Mesoporous zeolite materials as described herein can offer a significant advantage over unmodified conventional zeolites in organic dye and pollutant removal due to the larger surface area and pore size of the mesoporous zeolite materials.

Application in Petrochemical Processing

The mesoporous zeolite materials as described herein as described herein can have one or more of controlled pore volume, controlled pore size (e.g., cross sectional area and/or diameter), and controlled pore shape. Hydrocarbon reactions, including petrochemical processing, are mass-transfer limited. Accordingly, a mesoporous catalyst with controlled pore volume, pore size, and/or pore shape can facilitate transport of the reactants to and within active catalyst sites within the mesoporous catalyst and transport the products of the reaction out of the catalyst. Mesoporous zeolite materials as described herein enable processing of very large or bulky molecules, with dimensions of, for example, from about 2 to about 60 nm, from about 5 to about 50 nm, and from about 30 to about 60 nm.

Hydrocarbon and/or petrochemical feed materials that can be processed with the mesoporous zeolite materials as described herein can include, for example, a gas oil (e.g., light, medium, or heavy gas oil) with or without the addition of resids. The feed material can include thermal oils, residual oils, (e.g., atmospheric tower bottoms (ATB), heavy gas oil (HGO), vacuum gas oil (VGO), and vacuum tower bottoms (VTB)), cycle stocks, whole topped crudes, tar sand oils, shale oils, synthetic fuels (e.g., products of Fischer-Tropsch synthesis), heavy hydrocarbon fractions derived from the destructive hydrogenation of coal, tar, pitches, asphalts, heavy, sour, and/or metal-laden crude oils, and waxy materials, including, but not limited to, waxes produced by Fischer-Tropsch synthesis of hydrocarbons from synthesis gas. Hydrotreated feedstocks derived from any of the above described feed materials may also be processed by using the mesoporous zeolite materials described herein.

Heavy hydrocarbon fractions from crude oil contain most of the sulfur in crude oils, mainly in the form of mercaptans, sulfides, disulfides, thiophenes, benzothiophenes, dibenzothiophenes, and benzonaphthothiophenes, many of which are large, bulky molecules. Similarly, heavy hydrocarbon fractions contain most of the nitrogen in crude oils, principally in the form of neutral N-compounds (indole, carbazole), basic N-compounds (pyridine, quinoline, acridine, phenenthridine), and weakly basic N-compounds (hydroxipyridine and hydroxiquinoline) and their substituted H-, alkyl-, phenyl- and naphthyl-substituted derivatives, many of which are large, bulky materials. Sulfur and nitrogen species are removed for production of clean fuels and resids or deeper cut gas oils with high metals content can also be processed using the mesoporous zeolite materials as described herein.

In various embodiments, the mesoporous zeolite materials as described herein can be employed in chemical processing operations including, for example, catalytic cracking, fluidized catalytic cracking, hydrogenation, hydrosulfurization, hydrocracking, hydroisomerization, oligomerization, alkylation, or any of these in combination. Any of these chemical processing operations may be employed to produce, for example, a petrochemical product by reacting a petrochemical feed material with one or more of the mesoporous zeolite materials described herein. In various embodiments, the mesoporous zeolite material having long-range crystallinity can be used as an additive to other catalysts and/or other separation materials including, for example, a membrane, an adsorbent, a filter, an ion exchange column, an ion exchange membrane, or an ion exchange filter.

In various embodiments, the mesoporous zeolite materials as described herein can be used alone or in combination as an additive to a catalyst. The mesoporous zeolite material having long-range crystallinity can be added at from about 0.05 to about 100 weight percent to the catalyst. The additive may be employed in chemical processing operations including, for example, catalytic cracking, fluidized catalytic cracking, hydrogenation, hydrosulfurization, hydrocracking, hydroisomerization, oligomerization, alkylation, or any of these in combination. For example, the addition of small amounts of mesoporous zeolite materials as described herein and/or crystalline nanostructured zeolites to conventional commercially available FCC catalysts allows for improvement in the catalytic performance.

Generally, FCC catalysts employed in various fluidized catalytic cracking processes typically have an average particle size in the range of from about 10 to about 200 microns. In operation, the FCC catalyst can be combined with atomized feed and the mixture can be propelled upwardly in a reaction zone or riser. During reaction, contact between the feedstock and catalyst at elevated temperatures results in a reduction of at least a portion of the high-molecular weight, long chain hydrocarbons into lighter, lower-molecular weight hydrocarbon products. Gaseous reaction products and spent catalyst are discharged from the riser into a separator, which removes the hydrocarbon from the spent catalyst, which is subsequently transferred to a regenerator to be regenerated and recycled back to the riser. Typical FCC reaction conditions include a riser top temperature of about 500 to about 595° C., a catalyst/oil weight ratio of about 3 to about 12, and a catalyst residence time in the riser of about 0.5 to about 15 seconds. The higher activity of the mesoporous zeolite materials as described herein can enable less severe processing conditions, such as, for example, lower temperature, lower catalyst to oil ratios, and/or lower contact time.

In various embodiments, a small amount of mesoporous zeolite material having long-range crystallinity may be blended with conventional FCC catalysts to enable pre-cracking of the bulkier molecules in the blend. Conventional FCC catalysts typically have pore sizes that are much too small to accommodate bulkier molecules. After the bulkier molecules have been pre-cracked, the lower-molecular weight hydrocarbons can then be processed more effectively by conventional FCC catalyst.

In various embodiments, mesoporous zeolite materials as described herein may be blended with conventional catalysts in one or more different catalytic processes. In the same or other embodiments, the additive mesoporous zeolite materials can be incorporated into the conventional catalyst pellet. Shaped (e.g., pelletized) mesoporous materials can be mixed with the catalyst pellet. Alternatively, a conventional catalyst and the mesoporous zeolite materials described herein may be loaded in the same reaction zone and layered, mixed, or otherwise inter-dispersed with one another. These mixtures can be used in fixed bed applications, fluidized bed applications, or any other type of catalytic application. The mesoporous zeolites as described herein can be used like any other catalytic mixture in any refining applications, including, for example, blends of FCC catalysts and additives. The amount of mesoporous zeolite material added to or incorporated with a specific catalyst, as well as the manner by which it is blended, depend on the specific application. Additionally, the amount and method of incorporation of mesoporous zeolite material can be used to tune the yield and/or the structure of the products.

In one or more embodiments, the addition of or incorporation of mesoporous zeolite materials as described herein to conventional commercially available Thermofor Catalytic Cracking (TCC) catalysts can also provide an improvement in the catalytic performance. The TCC process is a moving bed process that uses pellet or bead shaped conventional catalysts having an average particle size of about one-sixty-fourth to one-fourth inch. Hot catalyst beads progress with a hydrocarbon or petrochemical feedstock downwardly through a cracking reaction zone. The hydrocarbon products are separated from the spent catalyst and recovered. The catalyst is recovered at the lower end of the zone and recycled (e.g., regenerated). Typically, TCC conversion conditions include an average reactor temperature from about 450 to about 510° C., a catalyst/oil volume ratio of from about 2 to about 7, and a reactor space velocity of from about 1 to about 2.5 vol/hr/vol. Mesoporous zeolite materials of the present invention can be substituted for or otherwise incorporated (e.g., blended) with TCC catalysts to improve the catalytic cracking of petrochemical or hydrocarbon feedstocks to petroleum product.

In various embodiments, mesoporous zeolite materials as described herein can be used as catalyst additives in any other catalytic application. For example, they may be used as additives in processes where bulky molecules must be processed.

In other various embodiments, mesoporous zeolite materials as described herein can be used in hydrogenation. Conventional zeolites are good hydrogenation supports because they possess a level of acidity needed both for the hydrogenation of the aromatic compounds and for tolerance to poisons such as, for example, sulfur. However, the small pore size of conventional zeolites limit the size of the molecules that can be hydrogenated. Various metals, such as Pt, Pd, Ni, Co, Mo, or mixtures of such metals, can be supported on mesoporous zeolite materials as described herein using surface modification methods, for example, ion exchange, described herein. The hydrogenation catalytic activity of mesoporous zeolite materials as described herein modified to support various metals (e.g., doped with metals) shows a higher hydrogenation activity for bulky aromatic compounds as compared to other conventional materials, for example, metal supported on alumina, silica, metal oxides, MCM-41, and conventional zeolites. The mesoporous zeolite materials modified to support various metals also show, compared to conventional materials, a higher tolerance to sulfur, for example, sulfur added as thiophene and dibenzothiophene, which are common bulky components of crude oil that often end up in gas oil fractions.

In other various embodiments, mesoporous zeolite materials as described herein can be used in hydrodesulfurization ("HDS"), including, for example, deep HDS, hydrodesulfurization of 4,6-dialkyldibenzothiophenes. Deep removal of sulfur species from gas oil has two main limitations: i) the very low reactivity of some sulfur species, for example, dimethyldibenzothiophenes and ii) the presence of inhibitors in the feedstocks such as, for example, $H_2S$. Deep HDS is currently done with active metal sulfides on alumina, silica/alumina, and alumina/zeolite.

Generally, during hydrodesulfurization, the feedstock is reacted with hydrogen in the presence of an HDS catalyst. Oxygen and any sulfur and nitrogen present in the feed are reduced to low levels. Aromatics and olefins are also reduced. The HDS reaction conditions are selected to minimize cracking reactions and may typically include a reaction temperature from about 400 to about 900° F., a pressure between 500 to 5,000 psig, a feed rate (LHSV) of 0.5 $hr^{-1}$ to 20 $hr^{-1}$ (v/v), and overall hydrogen consumption of 300 to 2,000 standard cubic feet per barrel (scf/bbl) of liquid hydrocarbon feed (53.4-356 $m^3$ $H_2/m^3$ feed). Suitable active metal sulfides for use in HDS catalysts can include, for example, Ni and Co/Mo sulfides. Zeolites provide strong acidity, which improves hydrodesulfurization of refractory sulfur species through methyl group migration. Zeolites also enhance the hydrogenation of neighboring aromatic rings. Zeolite acidity enhances the liberation of $H_2S$ from the metal sulfide increasing the tolerance of the catalyst to inhibitors. However, bulky methylated polyaromatic sulfur species are not able to access the acidic sites of conventional zeolites. In contrast, the controlled mesoporosity and strong acidity of mesoporous zeolite materials as described herein provide accessibility to the acidic sites and acidity that allows for the deeper levels of desulfurization, which are or will required for meeting current and future environmental restrictions.

In other various embodiments, mesoporous zeolite materials as described herein can be used in hydrocracking Metals, including noble metals such as, for example, Ni, Co, W, and Mo, and metal compounds are commercially used in hydrocracking reactions. These metals can be supported on mesoporous zeolite materials as described herein by previously described methods. The mesoporous zeolite materials as described herein including metals can be employed for hydrocracking of various feedstocks such as, for example, petrochemical and hydrocarbon feed materials.

Typically, hydrocracking involves passing a feedstock, which can include one or more heavy oil or gas oil cuts from various other refinery processes (e.g., vacuum tower, crude tower, etc.), through one or more hydrocracking catalyst beds under conditions of elevated temperature and/or pressure. The plurality of catalyst beds may function to remove impurities such as any metals and other solids. The catalyst beads also crack or convert the longer chain molecules in the feedstock into smaller molecules. Hydrocracking can be carried out by contacting the particular fraction or combination of fractions with hydrogen in the presence of a suitable catalyst at conditions, including temperatures in the range of from about 600 to about 900° F. and at pressures from about 200 to about 4,000 psia, using space velocities based on the hydrocarbon feedstock of about 0.1 to 10 $hr^{-1}$.

As compared to conventional unmodified catalyst supports such as, for example, alumina, silica, and zeolites, the mesoporous zeolite materials as described herein that have been modified to include one or more catalytic metals may allow for the hydrocracking of higher boiling point feed materials. The mesoporous zeolite materials including metals produce a low concentration of heteroatoms and a low concentration of aromatic compounds. The mesoporous zeolite materials including metals can exhibit bifunctional activity. The metal, for example a noble metal, catalyzes the dissociative adsorption of hydrogen, while the mesoporous zeolite material provides the acidity. Additionally, the controlled pore size and controlled mesopore surface in the mesoporous zeolite materials that include metals can make the bifunctional activity more efficiently present in the mesoporous catalysts as compared to a bifunctional conventional catalyst. In addition to the zeolite acidity present in the mesoporous zeolite materials as described herein, the controlled pore size enables larger pores that allow for a high dispersion of the metal phase and further permit processing of larger, longer-chain hydrocarbons.

In other embodiments, mesoporous zeolite materials as described herein can be used in hydroisomerization. Various metals and mixtures of metals, including, for example, noble metals such as nickel or molybdenum and combinations thereof in, for example, their acidic form, can be supported on one or more mesoporous zeolite materials as described herein. Typically, hydroisomerization is used to convert linear paraffins to branched paraffins in the presence of a catalyst and is carried out in a hydrogen-rich atmosphere. Hydroisomerization catalysts useful for isomerization processes are generally bifunctional catalysts that include a dehydrogenation/hydrogenation component and an acidic component. The mesoporous zeolite materials including metals permit hydroisomerization of bulkier molecules than is possible with commercial conventional catalysts due, at least in part, to their controlled pore size and pore volume.

In other embodiments, mesoporous zeolite materials as described herein can be used in the oligomerization of olefins. The controlled pore shape, pore size, and pore volume improves the selectivity properties of catalysts formed using mesoporous zeolite materials. The selectivity properties, the increased surface area present in the mesopore surfaces, and the more open structure of the mesoporous zeolite materials can be used to better control the contact time of the reactants, reactions, and products inside the mesoporous zeolite material. During oligomerization, the olefin can be contacted with the mesoporous zeolite materials at relatively low temperatures to produce mainly middle-distillate products. By increasing the reaction temperature, the selectivity can shift and gasoline can be produced as the primary fraction.

When the mesoporous zeolite materials as described herein are used in FCC processes, the yield of olefins production may be increased relative to the olefin production achieved with conventional FCC catalysts formed with traditional zeolites. Subsequently, the olefins can be reacted by oligomerization in an olefin-to-gasoline-and/or-diesel process, such as, for example, a MOGD (Mobile Olefins to Gas and Diesel) process configured to convert olefins to gas and diesel. In addition, olefins of more complex structures can also be oligomerized using the mesoporous zeolite materials as described herein.

The LPG fraction produced from an FCC employing catalysts formed with the mesoporous zeolites described herein may have a higher concentration of olefins as compared to other catalysts, including, for example, various conventional FCC catalysts, zeolites, metals oxides, and clays under catalytic cracking conditions both in fixed bed and fluidized bed reactor conditions. The size of the mesopores of the zeolite materials described herein readily allow the cracked products to exit the pores after reaction. Accordingly, hydrogen transfer reactions are reduced and the undesired transformation of olefins to paraffins in the LPG fraction is reduced. In addition, over-cracking and coke formation are limited, which increases the average life time of the catalyst and increases the value of the final product.

The acidity and the controlled mesoporosity present in the mesoporous zeolite materials as described herein also make these materials suitable for use in alkylation reactions. Specifically, during alkylation, olefins and paraffins, usually isoparaffins, react in the presence of a catalyst to form highly branched octanes. Because of the mesopore size and volume of the zeolite materials described herein, the highly branched octane products may readily exit the open structure, thereby minimizing unwanted olefin oligomerization and providing a higher volume of desired products.

In other embodiments, a petrochemical feed can be contacted with the mesoporous zeolite material as described herein to facilitate dehydrogenation of one or more hydrocarbon compounds. Generally, such reaction conditions include, for example, a temperature of from about 300 to about 700° C., a pressure from about 0.1 to about 10 atm, and a WHSV from about 0.1 to about 20 $hr^{-1}$. For example, in one embodiment, the mesoporous zeolite material can be used convert paraffins to olefins or aromatics. Generally, such reaction conditions include, for example, a temperature of from about 300 to about 700° C., a pressure from about 0.1 to about 60 atm, a WHSV of from about 0.5 to about 400 $hr^{-1}$, and an $H_2/HC$ mole ratio of from about 0 to about 20.

In other embodiments, a petrochemical feed can be contacted with the mesoporous zeolite materials as described herein under reaction conditions suitable for converting olefins to aromatics. Generally, such reaction conditions include, for example, a temperature of from about 100 to about 700° C., a pressure from about 0.1 to about 60 atm, a WHSV of from about 0.5 to about 400 $hr^{-1}$, and an $H_2/HC$ mole ratio from about 0 to about 20.

In other embodiments, a petrochemical feed can be contacted with the mesoporous zeolite materials as described herein under reaction conditions suitable for isomerizing alkyl aromatic feedstock components. Generally, such reaction conditions include, for example, a temperature of from about 230 to about 510° C., a pressure from about 3 to about 35 atm, a WHSV of from about 0.1 to about 200 $hr^{-1}$, and an $H_2$/HC mole ratio of from about 0 to about 100.

In other embodiments, a petrochemical feed can be contacted with the mesoporous zeolite materials as described herein under reactions conditions suitable for disproportionating alkyl aromatic components. Generally, such reaction conditions include, for example, a temperature ranging from about 200 to about 760° C., a pressure ranging from about 1 to about 60 atm, and a WHSV of from about 0.08 to about 20 $hr^{-1}$.

In other embodiments, a petrochemical feed can be contacted with the mesoporous zeolite materials as described herein under reaction conditions suitable for alkylating aromatic hydrocarbons (e.g., benzene and alkylbenzenes) in the presence of an alkylating agent (e.g., olefins, formaldehyde, alkyl halides and alcohols). Generally, such reaction conditions include a temperature of from about 250 to about 500° C., a pressure from about 1 to about 200 atm, a WHSV of from about 2 to about 2,000 $hr^{-1}$, and an aromatic hydrocarbon/alkylating agent mole ratio of from about 1/1 to about 20/1.

In other embodiments, a petrochemical feed can be contacted with the mesoporous zeolite materials as described herein under reaction conditions suitable for transalkylating aromatic hydrocarbons in the presence of polyalkylaromatic hydrocarbons. Generally, such reaction conditions include, for example, a temperature of from about 340 to about 500° C., a pressure from about 1 to about 200 atm, a WHSV of from about 10 to about 1,000 $hr^{-1}$, and an aromatic hydrocarbon/polyalkylaromatic hydrocarbon mole ratio of from about 1/1 to about 16/1.

Generally, suitable conditions for a petrochemical or hydrocarbon feed to contact the mesoporous zeolite materials as described herein include temperatures ranging from about 100 to about 760° C., pressures ranging from above 0 to about 3,000 psig, a WHSV of from about 0.08 to about 2,000 $hr^{-1}$, and a hydrocarbon compound mole ratio of from 0 to about 100.

Application in Compound Removal

The microporosity, mesoporosity, and ion exchange properties present in the mesoporous zeolite materials as described herein can enable removal of inorganic and organic compounds from solutions. Suitable solutions can be aqueous or organic solutions. Accordingly, the mesoporous zeolite materials as described herein can be employed in water treatment, water purification, pollutant removal, and/or solvent drying. Other configurations such as fixed bed, filters, and membranes can be also used in addition to the mesoporous zeolite materials. Optionally, mesoporous zeolite materials as described herein can be employed as additives with conventional separation means, for example, fixed bed, filters, and membranes. The mesoporous zeolite materials can be substituted for other separation means in, for example, fixed bed, filters, and membranes. The mesoporous zeolite materials can be recycled by ion exchange, drying, calcinations or other conventional techniques and reused.

Application in Adsorption

The mesoporous zeolite materials as described herein can be used to adsorb gaseous compounds including, for example, volatile organic compounds ("VOCs"), which are too bulky to be adsorbed by conventional unmodified zeolites. Accordingly, pollutants that are too bulky to be removed by conventional unmodified zeolites can be removed from a gaseous phase by direct adsorption. Mesoporous zeolite materials can be employed for adsorption in various adsorption configurations such as, for example, membranes, filters and fixed beds. Adsorbed organic compounds can be desorbed from the mesoporous zeolite materials as described herein by heat treatment. Thus, the mesoporous zeolite materials as described herein can be recycled and then reused.

Application in Gas Separation

Mesoporous zeolite materials as described herein can be grown on various supports by employed techniques such as, for example, seeding, hydrothermal treatment, dip coating, and/or use of organic compounds. They can be physically mixed with conventional zeolites or metal oxides. Continuous layers of mesoporous zeolite materials can be used as membranes and/or catalytic membranes on, for example, porous supports. Mesoporous zeolite materials as described herein can be employed in various configurations including, for example, membranes for separation of gases based on physicochemical properties such as, for example, size, shape, chemical affinity, and physical properties.

Application in Fine Chemicals and Pharmaceuticals

A mesoporous zeolite material having long-range crystallinity has increased active site accessibility as compared to the same zeolite in conventional form. Accordingly, the activity of some important chemical reactions used in fine chemical and pharmaceutical production can be improved by substituting a conventional zeolite used in the process for a mesoporous zeolite material as described herein. In addition, the mesoporous zeolite material may be employed as an additive to a catalyst typically employed in such fine chemical and pharmaceutical production reactions. Suitable processes that can be improved by using a mesoporous zeolite material having long-range crystallinity include, for example, isomerization of olefins, isomerization of functionalized saturated systems, ring enlargement reactions, Beckman rearrangements, isomerization of arenes, alkylation of aromatic compounds, acylation of arenes, ethers, and aromatics, nitration and halogenation of aromatics, hydroxylation of arenes, carbocyclic ring formation (including Diels-Alder cycloadditions), ring closure towards heterocyclic compounds, amination reactions (including amination of alcohols and olefins), nucleophilic addition to epoxides, addition to oxygen-compounds to olefins, esterification, acetalization, addition of heteroatom compounds to olefins, oxidation/reduction reactions such as, but not limited to, Meerwein-Ponndorf-Verley reduction and Oppenauer oxidation, dehydration reactions, condensation reactions, C—C formation reactions, hydroformylation, acetilization, and amidation.

Application in Slow Release Systems

Chemicals and/or materials having useful properties such as, for example, drugs, pharmaceuticals, fine chemicals, optic, conducting, semiconducting magnetic materials, nanoparticles, or combinations thereof, can be introduced to mesoporous zeolite materials as described herein using one or more modifying methods. For example, chemicals and/or materials may be incorporated into the mesoporous zeolite materials as described herein by, for example, adsorption or ion exchange. In addition, such useful chemicals can be combined with the mesoporous zeolite materials as described herein by creating a physical mixture, a chemical reaction, heat treatment, irradiation, ultrasonication, or any combination thereof.

The release of the chemicals and/or materials having useful properties can be controlled. Controlled release may take place in various systems such as, for example, chemical reactions, living organisms, blood, soil, water, and air. The controlled release can be accomplished by physical reactions or by chemical reactions. For example, controlled release can be accomplished by chemical reactions, pH variation, concentration gradients, osmosis, heat treatment, irradiation, and/or magnetic fields.

Kits

One or more embodiments of the present invention also provide kits for conveniently and effectively implementing various methods described herein. Such kits can comprise any of the mesoporous zeolite materials as described herein, and a means for facilitating their use consistent with various methods. Such kits may provide a convenient and effective means for assuring that the methods are practiced in an effective manner. The compliance means of such kits may include any means that facilitate practicing one or more methods associated with the zeolite materials described herein. Such compliance means may include instructions, packaging, dispensing means, or combinations thereof. Kit components may be packaged for either manual or partially or wholly automated practice of the foregoing methods. In other embodiments involving kits, a kit is contemplated that includes block copolymers, and optionally instructions for their use.

EXAMPLES

The following examples are intended to be illustrative of the present invention in order to teach one of ordinary skill in the art to make and use the invention and are not intended to limit the scope of the invention in any way.

Example 1 (Comparative)—Preparation of an Unrived USY Zeolite Material

Two samples of sodium-exchanged zeolite Y (NaY) materials, one sample commercially available from Zeolyst International under the trade name CBV-100 and the other (a slurry) commercially available from Grace Davidson, were obtained. The second sample, referred to as the "Grace NaY" herein, was separated from the slurry and several properties of each NaY material were measured. Table 1, below. The Si/Al content was measured using a combination of bulk chemical analysis and $^{27}$Al MAS NMR, as described above, and UCS and crystallinity were calculated from X-ray diffraction patterns recorded on a PANanalytical CubiXPRO diffractometer using CuKα radiation at 45 kV. The 0 to 20 Å diameter micropore and 20 to 300 Å diameter mesopore volumes were measured using Argon adsorption at 87K with a Quadrasorb SI instrument and calculated according to the Density Functional Theory (DFT), and the moisture content was determined as the loss on ignition at 700° C.

TABLE 1

Properties of Two Commercially-Available NaY Samples

| Property | CBV-100 | Grace NaY |
|---|---|---|
| SAR | 5.18 | 5.5 |
| Moisture, wt % | 23 | nd |
| Unit Cell Size, Å | 24.66 | 24.65 |
| Crystallinity, % | 100% | nd |
| Micropore Volume, cc/g | 0.39 | 0.40 |
| Mesopore Volume, cc/g | 0.03 | 0.03 |

Each sample was then treated to form a conventional ultrastable zeolite Y (USY) material. To do so, 100 grams of CBV-100 was dispersed in 400 grams of deionized water along with 75 grams of NH$_4$NO$_3$ salt (commercially available from Fischer Scientific). The mixture, which had a weight ratio of anhydrous zeolite to NH$_4$NO$_3$ of about 1:1, was agitated to facilitate ammonium exchange. A few drops of 10 percent nitric acid were added to the suspension to adjust the pH to about 4 and the suspension was heated to a temperature of 80° C. under agitation. After about 30 minutes, the ammonium-exchanged zeolite was separated from the solution via vacuum filtration with a Buchner funnel and washed twice with approximately 500 grams of deionized water. Thereafter, the ammonium-exchange procedure described above was repeated once more under the same conditions.

The separated, washed, and twice ammonium-exchanged zeolite was then dried at 80° C. The resulting dried sample was analyzed by XRF using a PANanalytical AX analyzer (commercially available from PANanalytical in Almelo, the Netherlands). The sodium-to-aluminum ratio of the sample was 0.25, indicating a sodium exchange of 75 percent. Additionally, several properties of the ammonium-exchanged material were determined and the results are summarized in Table 2, below.

TABLE 2

Properties of Ammonium-Exchanged CBV-100

| Property | Ammonium-Exchanged CBV-100 |
|---|---|
| SAR | 5.6 |
| Unit Cell Size, Å | 24.70 |
| Crystallinity, % | 107% |
| Micropore Volume, cc/g | 0.40 |
| Mesopore Volume, cc/g | 0.04 |

After drying, 40 grams of the ammonium-exchanged zeolite was placed into porcelain crucibles and the crucibles were loaded into a specially-designed chamber made from a high-temperature stable INCONEL alloy and designed to facilitate treatment of up to 100 grams of zeolite per run. The chamber included an inlet and an outlet ports with tubing designed to permit passage of steam or other heated fluid into the heating chamber. Once the sample-filled crucibles were loaded, the chamber was hermetically sealed and placed inside a muffle furnace, where the chamber and its contents were heated at a rate of 10° C. per minute. When the temperature within the sealed chamber reached 170° C., a mixture of 90 weight percent steam and 10 percent ammonia (NH$_3$) were pumped into the chamber at a rate of 0.6 mL/min. The chamber continued to be heated until the temperature inside the chamber reached 560° C., after which the pumping of the steam/ammonia mixture continued for another 2 hours. After the flow of steam and ammonia was stopped, the samples were held under a flow of nitrogen at a temperature of 560° C. for an hour. The flow of nitrogen was then stopped and replaced with a flow of dry air while the temperature inside the chamber continued to be maintained at 560° C. After one hour, the samples were allowed to cool while continuing the dry air purge. After cooling, a total of 33 grams of steam treated zeolite was recovered from the chamber.

A slurry comprising 10 weight percent of the steam-treated sample in deionized water was prepared and 25 grams of NH$_4$NO$_3$ was added to the suspension. Several drops of 10 percent NH$_4$OH was also added to adjust the pH of the mixture to approximately 4. In a similar manner as described previously, the mixture was then heated to 80° C.

under agitation before being filtered and washed with a volume of deionized water equal to the volume of the suspension liquid removed. The ammonia-exchange step was then repeated again and the twice-exchanged sample was filtered, washed, and then dried at 80° C. to form an ultra-stabilized zeolite Y (USY). Several properties of the USY are summarized in Table 3, below.

TABLE 3

Properties of CBV-100 USY

| Property | CBV-100 USY |
|---|---|
| SAR | 5.6 |
| Unit Cell Size, Å | 24.55 |
| Crystallinity, % | 92 |
| Micropore Volume, cc/g | 0.34 |
| Mesopore Volume, cc/g | 0.07 |

The dried USY sample was then loaded into crucibles and placed in the same closed chamber as described previously. The sample was heated to a temperature of 788° C. with a 100 percent steam purge. After 8 hours, the sample was removed and its properties tested. The results are summarized in Table 4, below.

TABLE 4

Properties of Steam-Treated CBV-100 USY

| Property | Steam-Stabilized CBV-100 USY |
|---|---|
| SAR | 5.6 |
| Unit Cell Size, Å | 24.27 |
| Crystallinity, % | 72 |
| Micropore Volume, cc/g | 0.23 |
| Mesopore Volume, cc/g | 0.11 |

Example 2 (Comparative)—Preparation of an Acid-Treated Zeolite Material

A 260-gram sample of CBV-100 (with an anhydrous weight of 200 grams) was dispersed in 1400 grams of deionized water. The dispersion had a pH of 10.5. Next, 902 grams of 5 percent sulfuric acid (which corresponded to an acid-to-zeolite ratio of 4.6 meq/anhydrous gram of the zeolite material) was added to the mixture, drop-wise, over a period of about 20 to 30 minutes. The pH of the resulting mixture stabilized between 2.6 and 2.7.

The resulting acid-treated zeolite was filtered via Buchner funnel to remove the liquid portion and the solids were washed several times with deionized water. During the first two iterations, several drops of 10 percent sulfuric acid were added to the wash water prior to contacting the solids in order to provide a wash liquid having a pH of approximately 4. The final wash step was carried out using unmodified deionized water. The solids content of the resulting filtered, acid-washed cake was 41 percent.

A 20-gram sample of the filtered cake was removed from the funnel and dried at room temperature. Several properties of the dried sample were determined and the results are summarized in Table 5, below.

TABLE 5

Properties of Acid-Treated CBV-100

| Property | Acid-Treated CBV-100 |
|---|---|
| SAR | 6.09 |
| Na/Al | 0.45 |
| Unit Cell Size, Å | 24.60 |
| Crystallinity, % | 65 |
| Micropore Volume, cc/g | 0.28 |
| Mesopore Volume, cc/g | 0.03 |

As evidenced by the Na/Al ratio, the acid treatment of the CBV-100 resulted in substantial replacement of sodium. More particularly, the Na/Al ratio indicates that over half of the moles of sodium were substituted by hydrogen ion. Assuming the solubility of silica is negligible under acidic conditions, the change in Si/Al ratio appears to indicate that an extraction of approximately 15 percent of the original $Al_2O_3$ molecules had occurred, as compared to the initial zeolite composition. Accordingly, it appears as well that aluminum loss was attendant to the loss of sodium during the acid treatment step.

The acid-treated and washed zeolite was then neutralized by re-slurrying the remaining cake with 1500 grams of deionized water and adding 232 grams of a 10 percent sodium carbonate solution. The ratio of sodium carbonate to zeolite was about 1.2 mmol/anhydrous gram. Prior to the addition of sodium carbonate, the slurry had a pH of approximately 5.0 and, after addition, the pH was 7.1. The slurry was agitated at room temperature before the neutralized solid was again recovered by vacuum filtration. During filtration, the solid was washed twice with 1500 grams of deionized water. The solids content of the resulting filter cake was 43 percent. A portion of the filter cake was removed and dried and the values for several properties of the dried sample were measured. The results are summarized in Table 6, below.

TABLE 6

Properties of Neutralized, Acid-Treated CBV-100

| Property | Neutralized, Acid-Treated CBV-100 |
|---|---|
| SAR | 6.02 |
| Na/Al | 0.94 |
| Unit Cell Size, Å | 24.61 |
| Crystallinity, % | 77 |
| Micropore Volume, cc/g | 0.35 |
| Mesopore Volume, cc/g | 0.03 |

As shown by comparison of Tables 5 and 6, neutralization of the acid-treated cake with sodium carbonate at room temperature did not alter Si/Al or UCS significantly, but did appear to ate least partially rebuild the sodium content, crystallinity, and micropore volume altered during acid treatment.

Next, 90 grams of the neutralized cake, which was approximately one half of the total amount remaining after filtration, was again treated with a basic solution of sodium carbonate at 80° C. in a "caustic healing" step. The treatment was carried out by first dispersing the neutralized sample in 700 g of deionized water then heating the resulting mixture for 25 minutes under agitation. During the heating, 0.03 grams of a filtration aide (commercially available as ARQUAD 2HT-75 from Akzo Nobel) was combined with the agitating slurry. Once the temperature of the mixture reached 80° C., 191 grams of a 10 percent sodium carbonate solution (2.0 mmol/g) was added and the resulting mixture was agitated at 80° C. for about 20 minutes. The dispersion had a pH of 9.6.

The resulting cake was again vacuum filtered using a Buchner funnel and the solids were washed three times with 1000 grams of heated deionized water. The resulting solid was removed from the filter and dried at 80° C. Values of several properties of the dried, caustic healed zeolite were measured and the results are summarized in Table 7, below.

TABLE 7

Properties of Caustic Healed CBV-100

| Property | Caustic Healed CBV-100 |
| --- | --- |
| SAR | 5.84 |
| Na/Al | 1.00 |
| Unit Cell Size, Å | 24.59 |
| Crystallinity, % | 94 |
| Micropore Volume, cc/g | 0.36 |
| Mesopore Volume, cc/g | 0.07 |

As shown in Table 7, reduction of the $SiO_2/Al_2O_3$ ratio indicates partial removal of silica from the zeolite structure and increase in Na/Al ratio indicates a complete sodium back exchange. The increase in crystallinity may be indicative of the ability of the caustic healing step to anneal defects of the crystalline structure caused during earlier treatment steps and the increase of mesopore volume demonstrates the increase of mesoporosity resulting from such a treatment.

The caustic-healed zeolite material was then subjected to an ammonium exchange step and then a steam treatment step at 560° C., followed by another ammonium exchange step. The resulting steam-treated zeolite material was then subjected to a steam stabilization step performed at 1400° F. for 8 hours to provide a steam-stabilized zeolite material. Several properties of the ammonium-exchanged, steam-treated, and steam-stabilized materials were tested and the results are summarized in Table 8, below.

TABLE 8

Properties of Various Zeolite Materials

| Property | Ammonium-Exchanged CBV-100 | Steam-Treated CBV-100 | Steam-Stabilized Zeolite |
| --- | --- | --- | --- |
| SAR | 5.81 | 5.87 | 5.85 |
| Na/Al | 0.24 | 0.02 | 0.02 |
| Unit Cell Size, Å | 24.64 | 24.51 | 24.25 |
| Crystallinity, % | 97 | 86 | 74 |
| Micropore Volume, cc/g | 0.37 | 0.30 | 0.22 |
| Mesopore Volume, cc/g | 0.09 | 0.12 | 0.13 |

Comparison of the properties of the caustic healed zeolite (shown in Table 7) and the ammonium-exchanged zeolite, show in the first column of Table 8, indicates a 76 percent substitution of the sodium, while the Si/Al ratio remains substantially unchanged. The reduction in UCS between the ammonium-exchanged zeolite and the steam-treated zeolite shown in the first two columns of Table 8 is likely the result of framework dealumination and formation of non-framework aluminum. Additionally, as shown in Table 8, the mesopore pore volume of the steam-treated zeolite remains relatively stable during steam testing (carried out at 1400° F. for 8 hours), while the crystallinity and microporosity the steam-stabilized zeolite reacted similarly to the last steaming stabilization step, in terms of crystallinity and microporosity, as did the USY sample tested in Example 1.

Example 3 (Comparative)—Preparation of Another Acid-Treated Zeolite

A 60-gram sample of Grace NaY, as described and characterized in Example 1, was diluted with 394 grams of deionized water to produce 1000 grams of a 20 percent NaY suspension. The pH of the suspension was 11.4. The diluted slurry was agitated and 882 grams of 5 percent sulfuric acid (4.5 acid meq/g of anhydrous NaY) was added to the mixture. The resulting suspension was agitated during acid admixing at a temperature of 25° C. for 130 minutes. The final pH of the slurry was 2.8.

The acid-treated zeolite was then filtered via vacuum filtration using a Buchner funnel and was washed three times. The first wash was carried out using 1000 grams of 1 percent sodium sulfate solution and the second wash was performed with 1000 grams of deionized water. Additionally, several drops of 10 percent sulfuric acid was added to each of the first and second wash liquids to provide wash liquids with a pH of approximately 4. The third wash was performed with 1000 grams of unmodified deionized water. A sample of the acid-treated filter cake was dried at room temperature and several properties of the resulting dried sample are summarized in Table 9, below.

TABLE 9

Properties of Acid-Treated Grace NaY

| Property | Acid-Treated Grace NaY |
| --- | --- |
| SAR | 6.61 |
| Na/Al | 0.56 |
| Unit Cell Size, Å | 24.59 |
| Crystallinity, % | 70 |

Next, a 180-gram portion of the filter cake was then dispersed in 500 grams of deionized water and 15 grams of 4 percent sodium hydroxide solution (0.2 mmol/g) was added to the dispersion, under agitation, at room temperature. The pH of the slurry increased from 5.9 to 7.0. Thereafter, the slurry was heated to 80° C. and held for 25 minutes. During heating, 0.03 grams of ARQUAD 2HT-75 (commercially available from Akzo Nobel) was added to the slurry and 135 g of 4 percent sodium hydroxide solution was added (1.5 mmol/g) once the dispersion reached 80° C. The pH of the dispersion was 9.8.

After 20 minutes, the solids were recovered from the dispersion via vacuum filtration with a Buchner funnel. During filtration, the solids were washed three times with 1000 grams of hot deionized water. The resulting caustic healed solids were then subjected to an ammonium exchange step carried out in a similar manner as described in previous Examples. After the ammonium-exchange step, the zeolite material was then subjected to steam stabilization at 560° C. followed by another ammonium-exchange step according to the procedures described above. The resulting material was the subjected to a steam stabilization treatment step carried out at 1400° F. for 8 hours. Several properties of the ammonium-exchanged zeolite, the steam-treated zeolite, and the steam stabilized zeolite are summarized in Table 10, below.

TABLE 10

Change of Properties of Grace NaY after Successive Treatment Steps

| Property | Ammonium-Exchanged Zeolite | Steam-Treated Zeolite | Steam-Stabilized Zeolite |
|---|---|---|---|
| SAR | 6.31 | 6.34 | 6.33 |
| Na/Al | 0.26 | 0.02 | 0.02 |
| Unit Cell Size, Å | 24.63 | 24.49 | 24.24 |
| Crystallinity, % | 93 | 81 | 65 |
| Micropore Volume, cc/g | 0.38 | 0.29 | 0.18 |
| Mesopore Volume, cc/g | 0.11 | 0.13 | 0.13 |

As shown above, use of an acid pretreatment step results in a zeolite material having a slightly higher mesopore volume (e.g., 0.13 cc/g for the steam-stabilized zeolite in Examples 2 and 3) than zeolites prepared without an acid pretreatment step (e.g., 0.11 cc/g for the steam-stabilized zeolite in Example 1).

Example 4 (Inventive)—Preparation of Mesoporous Zeolite via Acid Treatment at the Presence of a Non-Acidic Chelating Agent A sample of the Grace NaY that included 200 grams of anhydrous NaY was mixed with deionized water to form a slurry of 15 percent anhydrous zeolite. Next, 114 grams of sodium sulfate (4 mmol/g of anhydrous zeolite) was added to the mixture under agitation. The pH of the dispersion was 10. Next, 882 grams of 5 percent sulfuric acid (4.5 meq/g) was added to the agitating dispersion at 25° C. for 220 minutes. The final pH of the mixture was 2.7. Thereafter, the solids were recovered using the vacuum filtration and washing method described previously in Example 3. Several properties of the resulting acid-treated filter cake are summarized in Table 11 below.

TABLE 11

Properties of Zeolite Treated with Sulfuric Acid in the Presence of a Non-Acidic Sodium Sulfate Chelating Agent

| Property | Acid-Treated Zeolite |
|---|---|
| SAR | 6.98 |
| Na/Al | 0.88 |
| Unit Cell Size, Å | 24.59 |
| Crystallinity, % | 70 |
| Micropore Volume, cc/g | 0.36 |
| Mesopore Volume, cc/g | 0.03 |

As shown by comparing Tables 9 and 11, above, use of a non-acidic chelating agent, such as sodium sulfate, results in higher Si/Al ratio than acid-treated zeolites prepared without a chelating agent. This indicates that zeolites treated with a chelating agent experience higher levels of dealumination than those treated in the absence of a chelating agent, which is likely due to formation of soluble aluminum complexes formed with the chelating agent within the dispersion. Additionally, acid-treated zeolites treated in the presence of a chelating agent also exhibited improved crystallinity and higher Na retention than those treated only with an acid. Additionally, $^{27}$Al MAS NMR spectra of the acid-treated zeolites confirmed the presence of only tetrahedral aluminum, which indicates that the dealumination affected both framework and non-framework aluminum.

The acid-treated cake was then divided into two 95-gram portions and each portion was further treated separately. The first portion was dispersed in 800 grams of deionized water and combined with 25 grams of 4 percent sodium hydroxide solution (0.3 mmol/g) at room temperature. The resulting dispersion was agitated and the pH increased from 5.9 to 6.7. The slurry was then heated according to the method previously described in Example 3. Once the temperature of the slurry reached 80° C., 48 grams of 4 percent sodium hydroxide solution (0.5 mmol/anhydrous gram) was added to the mixture and the slurry was allowed to mix at 80° C. for 20 minutes. The final pH was 10.1.

The resulting neutralized solids were recovered via vacuum filtration with a Buchner funnel and were washed three times with deionized water according to the procedure described in Example 3. The zeolite was then dried, ammonium-exchanged, steam treated at 560° C., ammonium-exchanged again, and steam stabilized according to the methods described previously in Example 3. Several properties of the ammonium-exchanged zeolite, the steam-treated zeolite, and the steam-stabilized zeolite are provided in Table 12 below.

TABLE 12

Change of Properties of Mesoporous Zeolite Materials with Progress of Treatment Stages

| Property | Ammonium-Exchanged Zeolite | Steam-Treated Zeolite | Steam-Stabilized Zeolite |
|---|---|---|---|
| SAR | 6.51 | 6.51 | 6.49 |
| Na/Al | 0.27 | 0.02 | 0.02 |
| Unit Cell Size, Å | 24.59 | 24.48 | 24.24 |
| Crystallinity, % | 102 | 84 | 64 |
| Micropore Volume, cc/g | 0.40 | 0.30 | 0.20 |
| Mesopore Volume, cc/g | 0.13 | 0.17 | 0.20 |

Unlike the acid-treated zeolite materials prepared in Examples 2 and 3, the acid-treated zeolite materials prepared according to one embodiment of the inventive method described in this Example demonstrate an increase in mesopore volume upon steam stabilization (i.e., a 17 percent increase from 0.17 cc/g to 0.20 cc/g after steam stabilization).

The second 95-g portion of the wet acid cake was dispersed in 800 grams of deionized water and 0.2 mmol/g of a 2.5 percent solution of sodium carbonate was added to the mixture to raise pH to 6.7. Then the slurry was heated to 80° C. and 1 mmol of Na$_2$CO$_3$ (in 2.5 percent solution) was admixed per gram of anhydrous solid in the suspension. The mixture was agitated at 80° C. for 20 minutes. Thereafter, the solids were recovered via vacuum filtration and washed as described previously in Example 3. The resulting solids were ammonium-exchanged and steam treated at 560° C. before being ammonium-exchanged again and steam stabilized at 1400° F. for 8 hours. Several properties of the ammonium-exchanged, steam treated zeolite and the ammonium-exchanged, steam-tested stabilized zeolite are provided in Table 13 below.

TABLE 13

Properties of a Zeolite Material Healed with Sodium Carbonate Solution

| Property | Steam-Treated Zeolite | Steam-Stabilized Zeolite |
|---|---|---|
| SAR | 6.67 | 6.68 |
| Na/Al | 0.01 | 0.01 |
| Unit Cell Size, Å | 24.48 | 24.24 |
| Crystallinity, % | 84 | 66 |

TABLE 13-continued

Properties of a Zeolite Material Healed with Sodium Carbonate Solution

| Property | Steam-Treated Zeolite | Steam-Stabilized Zeolite |
|---|---|---|
| Micropore Volume, cc/g | 0.30 | 0.20 |
| Mesopore Volume, cc/g | 0.15 | 0.19 |

The results provided in Tables 12 and 13 above indicate that zeolites pretreated with sulfuric acid in the presence of a non-acidic chelating agent, such as sodium sulfate, exhibit a higher volume of steam stable mesopores, as compared to zeolites pretreated with sulfuric acid in the absence of a chelating agent (Examples 2 and 3).

Example 5 (Inventive)—Preparation of a Mesoporous Zeolite with Concentrated Acid Solution and a Non-Acidic Chelating Agent A sample of the Grace NaY slurry that included 200 grams of anhydrous NaY was combined with deionized water to provide 1000 grams of 20 weight percent slurry. The pH of the mixture was 11.4. Next, 170.4 grams of sodium sulfate (6 mmol/anhydrous gram) was added to the slurry, which was agitated at 30° C. for several minutes. The pH of the resulting mixture was 11.1. Thereafter, 220.5 grams of 20 percent sulfuric acid (4.5 meq/anhydrous gram) was added to the dispersion during agitation for 35 minutes. The final pH was 2.7.

The solid product was then recovered via vacuum filtration using a Buchner funnel as described previously and the recovered material was washed several times at room temperature. The first two washes were carried out with wash liquids including 1 percent sodium sulfate and a few drops of sulfuric acid to adjust the pH to 4. The third was performed to neutralize any residual acid, was carried out with 1000 grams of a 0.5 percent solution of sodium hydroxide. The solids were then washed the fourth time with 1000 grams of deionized water.

A 95-gram portion of the resulting filter cake was dispersed in 500 grams of deionized water and treated with 0.2 mmol of a 4 percent sodium hydroxide at room temperature. The resulting dispersion was then heated to 80° C. after addition of 0.03 grams of the filtration aide ARQUAD 2HT-75 (available from Akzo Nobel). At 80° C., 0.8 mmol of NaOH (in 4 percent solution) were admixed per each gram of anhydrous solid in the mixture. The resulting slurry was allowed to stir at 80° C. for 20 minutes.

The resulting solids were then recovered, ammonium-exchanged, steam treated at 560° C., and then ammonium-exchanged again before being steam stabilized at 1400° F. for 8 hours, as previously described. Several properties of the ammonium-exchanged, steam-treated, and steam-stabilized zeolite are summarized in Table 14 below.

TABLE 14

Properties of Mesoporous Zeolites

| Property | Ammonium-Exchanged Zeolite | Steam-Treated Zeolite | Steam-Stabilized Zeolite |
|---|---|---|---|
| SAR | 6.62 | 6.63 | 6.62 |
| Na/Al | 0.27 | 0.01 | 0.01 |
| Unit Cell Size, Å | 24.60 | 24.49 | 24.25 |
| Crystallinity, % | 99 | 81 | 65 |

TABLE 14-continued

Properties of Mesoporous Zeolites

| Property | Ammonium-Exchanged Zeolite | Steam-Treated Zeolite | Steam-Stabilized Zeolite |
|---|---|---|---|
| Micropore Volume, cc/g | 0.33 | 0.29 | 0.18 |
| Mesopore Volume, cc/g | 0.13 | 0.18 | 0.20 |

As shown in Table 14, use of a higher concentration of acid during an acid pretreatment step carried out with a chelating agent does not appear to impede creation of steam-stable mesopores in the final zeolite material. Further, as demonstrated by comparing the zeolite materials produced by the methods described in Examples 4 and 5, it appears that utilizing a higher concentration during the acid pretreatment step may permit a shorter acid admixing time without detrimental effects to the properties of the final zeolite material.

Example 6 (Inventive)—Preparation of an Acid-Treated Zeolite using a Non-Acidic Chelating Agent and Shorter Contact Time A 1000-gram sample of 20 percent slurry of Grace NaY was mixed with sodium sulfate in an amount of 6 mmol/anhydrous gram of NaY zeolite according to the procedure discussed previously in Example 5. The mixture was heated to 30° C. and 245 grams of 20 percent sulfuric acid (5 meq/g) was added at once to the agitated slurry. The mixture was allowed to stir for 30 minutes at 30° C., although the temperature of the solution had increased to 33° C. upon addition of the acid. The temperature of the solution returned to 30° C. and the pH stabilized at 2.8. Thereafter, the solids were filtered via vacuum filtration with a Buchner funnel and the remaining solids were washed four times at room temperature using the wash steps described previously in Example 5. Several properties of the recovered solids are summarized in Table 15, below.

TABLE 15

Properties of Acid-Treated Zeolite Material

| Property | Acid-Treated Zeolite |
|---|---|
| SAR | 7.06 |
| Na/Al | 1.05 |
| Unit Cell Size, Å | 24.58 |
| Crystallinity, % | 78 |
| Micropore Volume, cc/g | 0.37 |
| Mesopore Volume, cc/g | 0.08 |

The filtered and washed solids were then re-dispersed in 1000 grams of deionized water and 0.7 mmol/gram of sodium hydroxide was added to the solution, which was then heated to 80° C. The temperature of the slurry was maintained at 80° C. for 20 minutes and the final pH was 10.5. The resulting caustic healed zeolite was filtered and washed before being ammonium-exchanged and then steam treated at 560° C. The caustic healed, steam treated zeolite was then ammonium-exchanged again before being steam stabilized at 1400° F. for 8 hours, as described previously. Several properties of the steam-treated and steam-stabilized zeolite are summarized in Table 16, below.

TABLE 16

Properties of Mesoporous Zeolites

| Property | Steam-Treated Zeolite | Steam-Stabilized Zeolite |
|---|---|---|
| SAR | 6.51 | 6.49 |
| Na/Al ratio | 0.01 | 0.01 |
| Unit Cell Size, Å | 24.50 | 24.25 |
| Crystallinity, % | 90 | 72 |
| Micropore Volume, cc/g | 0.38 | 0.19 |
| Mesopore Volume, cc/g | 0.18 | 0.18 |

As shown in Table 16, "instantaneous" addition of acid during the pretreatment step does not appear to adversely impact the properties of the final zeolite material and results in a greatly reduced preparation time, as compared to other acid pretreatment methods.

Example 7 (Inventive)—Preparation of a Mesoporous Acid-Treated Zeolite with a Non-Acidic Chelating Agent and Lower Healing Temperature Initially, 255.6 grams of sodium sulfate were dissolved in 1800 grams of deionized water and 390 grams of CBV-100 (300 grams of anhydrous zeolite) were dispersed in the resulting solution. The ratio of sulfate to zeolite was 6 mmol/g and the pH of the slurry was 9.2. Next, 1470 grams of 5 percent sulfuric acid (at an acid-to-zeolite ratio of 5 meq/g) was added and the resulting mixture was agitated at 25° C. for 225 minutes. The final pH was 2.7. The solids were filtered from the dispersion via vacuum filtration with a Buchner funnel and the resulting acid cake was washed three times according to the procedure described in Example 3.

The recovered solids were then re-dispersed in deionized water to form a 10 percent slurry of acid-treated zeolite and sodium carbonate was added as a 10 percent solution to achieve a base-to-zeolite ratio of 0.3 mmol per anhydrous gram. The pH of the dispersion was 7.9. The solids were again recovered by vacuum filtration and washing and 190 grams of the resulting wet cake, which included 80 grams of anhydrous zeolite, was dispersed in 550 grams of deionized water. Next, 254 grams of 10 percent sodium carbonate solution, i.e. additional 3 mmol/anhydrous gram, was added to the dispersion and the resulting mixture was agitated at room temperature for 20 minutes. The resulting slurry had a pH of 10.2. The solids were again recovered before being ammonium-exchanged, steam treated at 560° C., and again ammonium-exchanged before being steam stabilized at 1400° F. for 8 hours, according to the procedures described in previous Examples.

Several properties of the steam-treated and steam-stabilized zeolite are summarized in Table 17, below. These results indicate that caustic healing may be carried out at lower temperatures.

TABLE 17

Properties of Various Zeolites

| Property | Steam-Treated Zeolite | Steam-Stabilized Zeolite |
|---|---|---|
| SAR | 6.54 | 6.55 |
| Na/Al ratio | 0.02 | 0.02 |
| Unit Cell Size, Å | 24.47 | 24.25 |
| Crystallinity, % | 72 | 54 |

TABLE 17-continued

Properties of Various Zeolites

| Property | Steam-Treated Zeolite | Steam-Stabilized Zeolite |
|---|---|---|
| Micropore Volume, cc/g | 0.24 | 0.18 |
| Mesopore Volume, cc/g | 0.16 | 0.17 |

Example 8—Preparation and Performance Testing of Catalysts Using Acid-Treated Zeolite Materials Several mesoporous zeolites were prepared in a similar manner as described in the previous Examples. Each initial sample was dispersed in water and then subjected to an acid pre-treatment step using sulfuric acid and 4.0 mmol of ammonium sulfate. The resulting acid-treated samples were filtered, washed, and dried, and were then subjected to a caustic healing step as described in Example 3, but with varying amounts of sodium hydroxide. Table 18, below summarizes some of the properties of the acid-treated and caustic-healed samples, labeled IZ-1 through IZ-6.

TABLE 18

Properties of Acid-Treated Zeolite Materials

| Sample | Amount of Acid, meq | SAR of Acid-Treated Cake | Amount of NaOH, mmol | SAR of Base-Treated Cake |
|---|---|---|---|---|
| IZ-1 | 4.0 | 6.8 | 2.0 | 6.4 |
| IZ-2 | 4.5 | 7.0 | 3.4 | 6.3 |
| IZ-3 | 4.5 | 7.0 | 3.0 | 6.2 |
| IZ-4 | 4.5 | 7.0 | 2.1 | 6.5 |
| IZ-5 | 4.5 | 6.8 | 1.9 | 6.4 |
| IZ-6 | 4.3 | 6.9 | 2.7 | 6.4 |

Each of the caustic healed samples listed in Table 18 above were individually subjected to an ammonium ion exchange step and a steam treatment step (at 560° C.) as also described in Example 3. The resulting, steam-treated, ammonium-exchanged zeolites were then rare earth ion exchanged by contacting the materials with a 27 weight percent solution of La(NO$_3$)$_3$ under agitation, and heating the resulting mixture to a temperature of about 70° C. for about 30 minutes. The resulting rare earth ion exchanged zeolite slurry was vacuum filtered and washed with hot water to produce a rare earth ion exchanged mesoporous zeolite filter cake. This procedure was repeated for each of the samples listed in Table 18, above.

Thereafter, each of the samples was used to prepare various mesoporous zeolite catalysts according to the following procedure. The catalysts were prepared according to the following procedure. First, for each sample, a feed slurry was prepared by mixing the rare earth ion exchanged mesoporous zeolite filter cake with Ludox brand DVSZN002 silica sol suspension (commercially available from Nalco), ASP-200 brand kaolin clay (commercially available from BASF), and water, such that the total solids content of the slurry was about 30 percent. The zeolite was present in the slurry in an amount of approximately 55 percent and each of the kaolin and silica sol were present in an amount of about 22.5 percent. The resulting slurry was then spray dried in a three foot diameter Bowen tower spray dryer with a #10 fountain nozzle with an atomizing air pressure of about 25 to 30 psig. The inlet air temperature was about 430° C. and the outlet air temperature was about 125°

C. The resultant chamber produced a mesoporous FCC catalyst precursor, which was calcined in a muffle furnace at a temperature of 450° C. for about 30 minutes to provide an FCC catalyst. This procedure was repeated separately for each of zeolite samples IZ-1 through IZ-6 to provide respective inventive catalyst samples IC-1 through IC-6.

In addition to the inventive catalysts described above, three additional comparative catalyst samples, CC-1 through CC-3, were prepared according to a similar procedure outlined above, except the mesoporous zeolites were pretreated with citric acid. No additional chelating agent was used to prepare these samples. Additionally, three samples of conventional (i.e., non-mesoporous) FCC catalyst, NC-1 through NC-3, were also provided, each having a different rare earth oxide (REO) loading.

Each of the inventive, comparative mesoporous, and conventional samples were then separately subjected to a steam deactiviation step, intended to simulate use in an FCC process. For each sample, a −100 to 270 mesh particle size fraction was calcined in 100 percent steam for eight hours at a temperature of 788° C. in a fluidizing environment. Properties of each of the steam-deactivated inventive catalyst samples (IC-1 through IC-6), steam-deactivated comparative mesoporous catalyst samples (CC-1 through CC-3), and steam-deactivated conventional FCC catalysts (NC-1 through NC-3) are summarized in Table 19, below.

TABLE 19

Properties of Steam Deactivated FCC Catalysts

| Catalyst Sample | % REO | UCS | Zeolite Surface Area | Mesopore Surface Area |
| --- | --- | --- | --- | --- |
| IC-1 | 4.2 | 24.31 | 137 | 63 |
| IC-2 | 4.1 | 23.34 | 116 | 68 |
| IC-3 | 4.3 | 24.32 | 113 | 78 |
| IC-4 | 4.2 | 24.34 | 146 | 66 |
| IC-5 | 4.3 | 24.34 | 149 | 78 |
| IC-6 | 2.0 | 24.25 | 104 | 66 |
| C-1 | 3.7 | 24.31 | 114 | 63 |
| C-2 | 2.2 | 24.29 | 117 | 80 |
| NC-1 | 4.2 | 24.30 | 157 | 55 |
| NC-2 | 2.8 | 24.29 | 158 | 55 |
| NC-3 | 1.4 | 24.25 | 157 | 49 |

Figure 1:
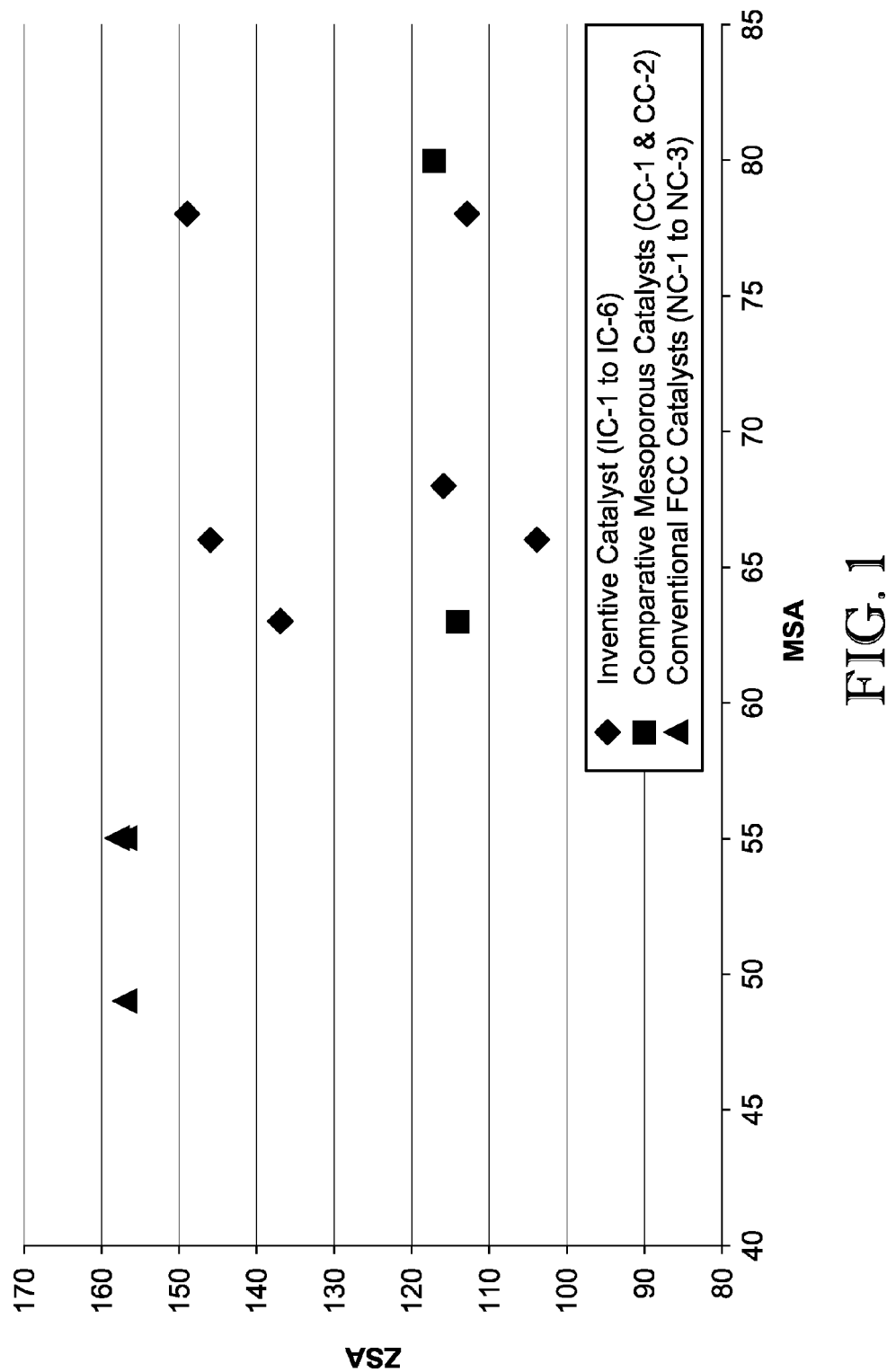
FIG. 1 is a graph of the mesopore volume versus micropore volume for the inventive zeolite catalysts, comparative mesoporous zeolite catalysts, and conventional FCC catalysts described in Example 8.

Additionally, FIG. 1 provides a graphical representation of the relationship between zeolite surface area (ZSA) and mesopores surface area (MSA) for each of the steam-deactivated samples listed in Table 19, above.

Each of the steam-deactivated FCC catalysts listed in Table 19 above were then tested for catalytic cracking performance using an Advanced Catalytic Evaluation ("ACE") test unit (commercially available from Kayser Technology, Inc.) and a paraffinic vacuum gas oil (VGO) feed having an API gravity of about 25, a 5 percent boiling point of about 345° C. and a 95 percent boiling point of about 600° C. The reactor temperature was 527° C. and the catalyst weight added was varied to test different catalyst to oil ("cat-to-oil" or C/O) ratios between about 3 and 9.

Figure 2:
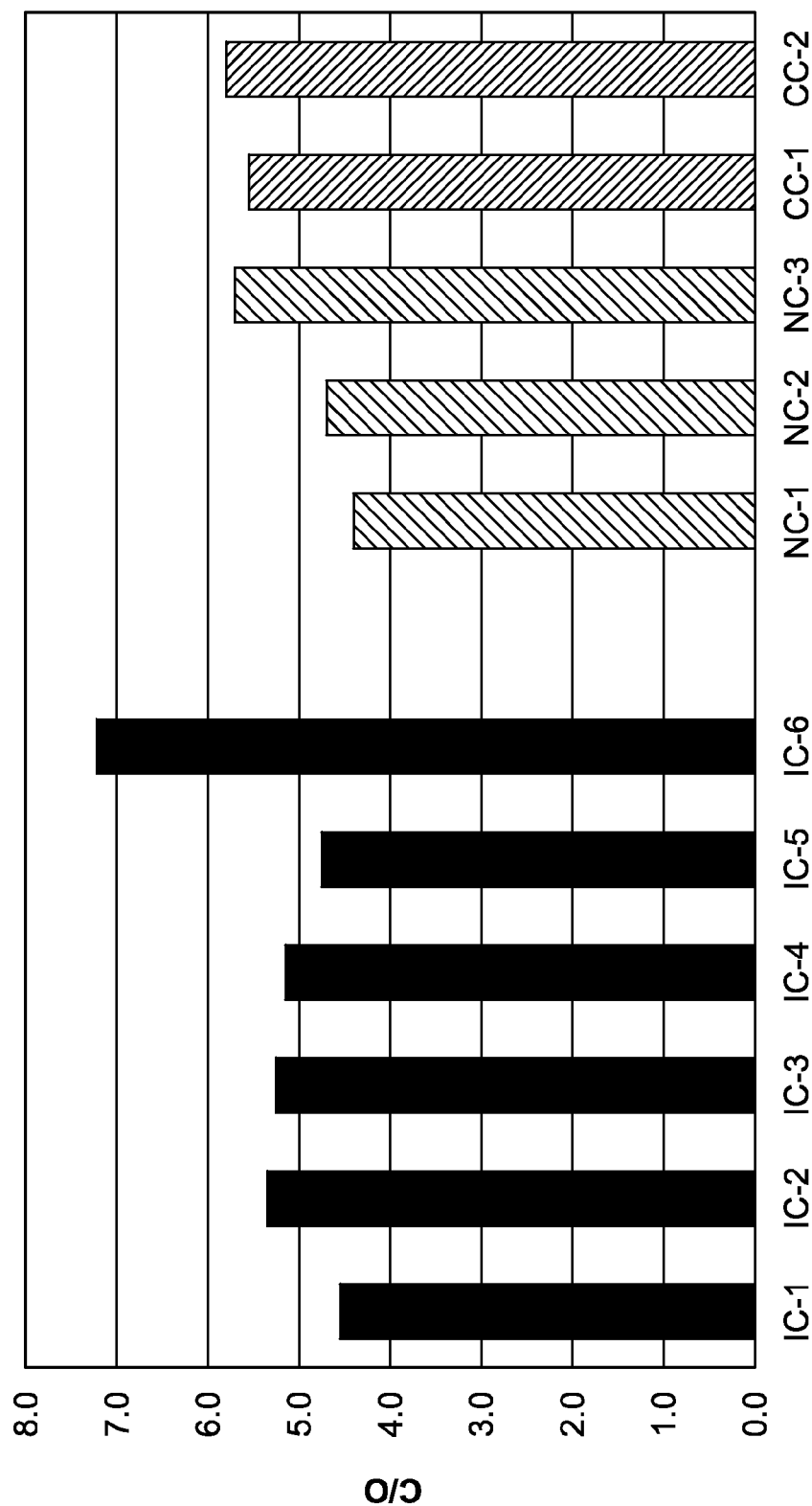
FIG. 2 is a graphical comparison of the results of the catalytic performance test conducted for each of the steam deactivated catalyst samples described in Example 8, particularly illustrating the catalyst-to-oil ratio required for each catalyst to achieve an overall conversion of 76 percent when subjected to the ACE test as described in Example 8.

The results of the performance testing are shown in FIGS. 2-5. FIG. 2 shows the cat-to-oil ratio that was required to achieve a conversion of 76 percent using each of the inventive, comparative mesoporous, and conventional catalysts. Catalyst activity is inversely proportion to cat-to-oil and, by comparison of the C/O values provided in FIG. 2, the inventive catalysts appear to have similar activities to both the comparative mesoporous and conventional samples. This indicates that use of the strong acid (e.g., sulfuric acid) did not adversely impact the pore structure of the zeolite used to form the catalyst.

Figure 3:
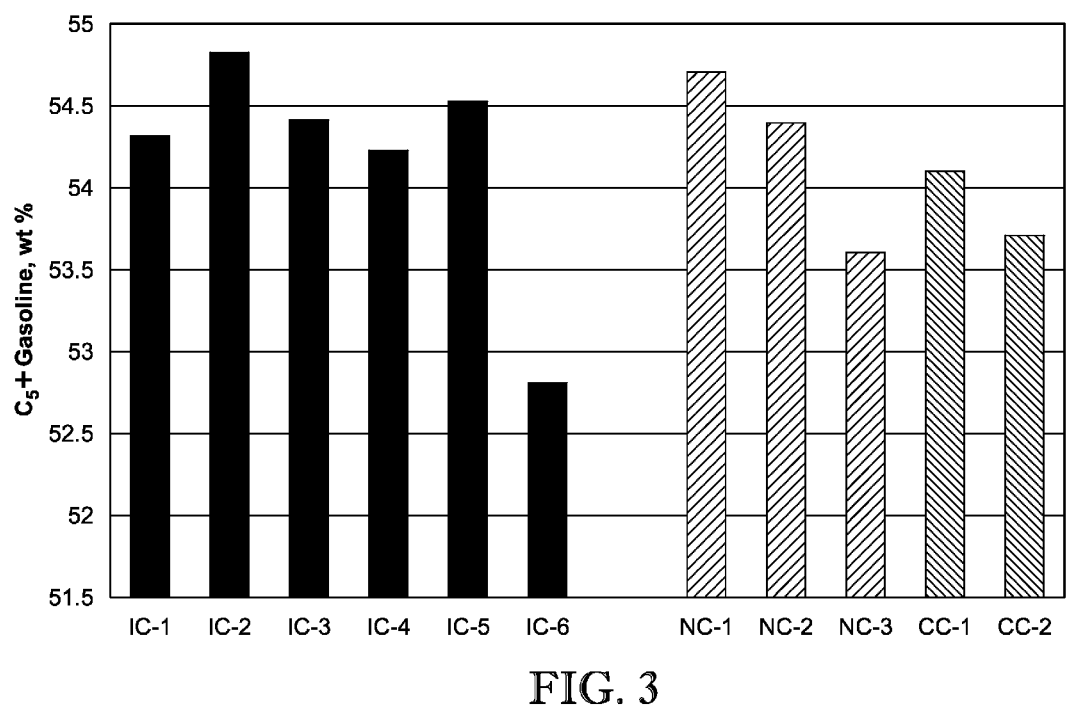
FIG. 3 is a graphical comparison of the results of the catalytic performance test conducted for each of the steam deactivated catalyst samples described in Example 8, particularly illustrating the $C_5+$ gasoline yield achieved by each catalyst during the ACE test as described in Example 8.

Turning to FIGS. 3-5, the gasoline selectivity, LCO selectivity, and Coke yield produced during the performance tests conducted on each of the inventive, comparative mesoporous, and conventional catalysts are provided in graphical form. Additionally, the inventive catalysts exhibit a slightly higher LCO and coke yields than the comparative and conventional samples. Consequently, again, it can be concluded that use of a strong, inorganic acid, such as sulfuric acid, when combined with a non-acidic chelating agent, may provide mesoporous zeolite materials useful in a variety of applications.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby states their intent to rely on the Doctrine of Equivalents to determine and assess the reasonably fair scope of the present invention as pertains to any apparatus not materially departing from but outside the literal scope of the invention as set forth in the following claims.

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

Unless otherwise indicated, the term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e., materials in which at least one of their dimensions is in the nanometer size range, such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, titanophosphates, etc. Its mesostructure maybe in the form of ordered mesporosity (as in, for example MCM-41, MCM-48 or SBA-15), non-ordered mesoporosity (as in mesocellular foams (MCF)), or mesoscale morphology (as in nanorods and nanotubes). The notation zeolite[mesostructure] is used to designate the different types of mesostructured zeolites.

"Y" represents a faujasite which is a zeolite comprising 2 moles of sodium and 1 mole of calcium in its octahedral crystal structure. This term also includes the acidic form of Y which may also be represented as "H—Y."

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, titanosilicates, etc.

What is claimed is:

1. A method for making a mesoporous zeolite material, said method comprising:
   (a) providing an initial zeolite material;
   (b) contacting said initial zeolite material with at least one strong acid and at least one non-acidic, multi-ligand chelating agent in an acid-containing mixture to thereby provide an acid-treated zeolite material; and
   (c) contacting at least a portion of said acid-treated zeolite material with a basic medium under conditions sufficient to increase the mesoporosity of said acid-treated zeolite material to thereby provide a mesoporous zeolite material.

2. The method of claim 1, wherein said acid is an inorganic acid.

3. The method of claim 1, wherein said acid is selected from the group consisting of hydrochloric acid, nitric acid, sulfuric acid, phosphoric acid, boric acid, perchloric acid, hydrofluoric acid, and combinations thereof.

4. The method of claim 1, wherein said contacting of step (b) includes contacting said initial zeolite material with two or more strong acids.

5. The method of claim 1, wherein said acid is present in said acid-containing mixture in an amount in the range of from about 1.5 to about 10 milliequivalents of acid per gram (meq/g) of said initial zeolite.

6. The method of claim 1, wherein said chelating agent is present in said acid-containing mixture in an amount in the range of from about 1 to about 10 millimoles of chelating agent per gram (mmol/g) of initial zeolite.

7. The method of claim 1, wherein the ratio of milliequivalents of said acid to the millimoles of said chelating agent in said acid-containing mixture (meq/mmol) is in the range of from about 0.10:1 to about 1.2:1.

8. The method of claim 1, wherein said chelating agent comprises at least one salt.

9. The method of claim 8, wherein said salt is selected from the group consisting of citrates, tartrates, gluconates, acetates, sulfates, phosphates, nitrates, and combinations thereof.

10. The method of claim 8, wherein said salt comprises the salt of at least one acid present in said acid-containing mixture.

11. The method of claim 1, wherein said contacting of step (b) includes combining at least a portion of said initial zeolite material with a liquid to form an initial slurry and adding said acid and said chelating to said initial slurry to form said acid-containing mixture.

12. The method of claim 11, wherein said acid is added to said initial slurry over a period of at least about 5 minutes.

13. The method of claim 1, wherein the pH of said acid-containing mixture during said contacting of step (b) is in the range of from about 1 to about 5.

14. The method of claim 1, further comprising, prior to said contacting of step (c), removing at least a portion of said acid-containing mixture from said acid-treated zeolite material.

15. The method of claim 1, wherein said conditions of said contacting of step (c) include a temperature in the range of from about 25° C. to about 100° C. and/or a time period in the range of from about 10 minutes to about 6 hours.

16. The method of claim 1, wherein said contacting of step (c) is performed in the substantial absence of a surfactant.

17. The method of claim 1, further comprising, subsequent to step (c), subjecting said mesoporous zeolite material to one or more post-formation treatment steps selected from the group consisting of calcination, ion exchange, steaming, incorporation into an absorbent, incorporation into a catalyst, re-alumination, silicon incorporation, incorporation into a membrane, and combinations thereof.

18. The method of claim 1, wherein said initial zeolite material is selected from the group consisting of zeolite A, faujasites, mordenites, CHA, ZSM-5, ZSM-12, ZSM-22, beta zeolite, synthetic ferrerite (ZSM-35), synthetic mordenite, and mixtures thereof.

19. The method of claim 1, wherein said initial zeolite material is selected from the group consisting of NaY, NH4Y, USY, a rare earth exchanged Y, or combination thereof.

20. The method of claim 1, wherein said mesoporous zeolite material has a total 20 to 80 Å mesopore volume at least 0.05 cc/g.

21. A method for making a mesoporous zeolite material, said method comprising:
   (a) contacting an initial zeolite material with at least one inorganic strong acid and at least one multi-ligand salt in an acid-containing mixture to thereby provide an acid-treated zeolite material;
   (b) separating at least a portion of said acid-treated zeolite material from said acid-containing mixture; and
   (c) further treating at least a portion of said acid-treated zeolite material separated in step (b) under conditions sufficient to increase the mesoporosity of said acid-treated zeolite material to thereby provide a mesoporous zeolite material.

22. The method of claim 21, wherein said salt is the salt of an inorganic acid.

23. The method of claim 21, wherein said salt comprises an anionic component selected from the group consisting of citrates, tartrates, gluconates, acetates, sulfates, phosphates, nitrates, and combinations thereof and a cationic component selected from the group consisting of alkaline earth metals and ammonium.

24. The method of claim 21, wherein the ratio of millimoles of said salt to the milliquivalents of said acid (mmol/meq) in said acid-containing mixture is in the range of from about 0.10:1 to about 1.2:1.

25. The method of claim 21, wherein said separating of step (b) includes contacting at least a portion of the separated zeolite material with at least one wash liquid.

26. The method of claim 25, wherein said wash liquid has a pH in the range of from about 2 to about 6.

27. The method of claim 26, wherein said wash liquid comprises at least one inorganic salt.

28. The method of claim 27, wherein said inorganic salt is the same as said salt present in said acid-containing mixture.

29. The method of claim 21, wherein said separating of step (b) comprises contacting at least a portion of said acid-treated zeolite material with a basic solution to thereby neutralize at least a portion of said acid.

30. The method of claim 21, wherein said treating of step (c) comprises contacting said acid-treated zeolite material with a basic medium in a first reaction mixture.

31. The method of claim 30, wherein said contacting further comprises contacting at least a portion of said acid-treated zeolite material with at least one surfactant in said first reaction mixture.

32. The method of claim 21, further comprising, subsequent to step (c), subjecting said mesoporous zeolite material to one or more post-formation treatment steps selected from the group consisting of calcination, ion exchange, steaming, incorporation into an absorbent, incorporation into a catalyst, re-alumination, silicon incorporation, incorporation into a membrane, and combinations thereof.

33. The method of claim 21, wherein said initial zeolite comprises zeolite Y.

34. The method of claim 21, wherein said mesoporous zeolite material has a total 20 to 80 Å mesopore volume at least 0.05 cc/g.

* * * * *